March 21, 1933.  H. L. BRUMP ET AL  1,902,158
AUTOMATIC PHONOGRAPH
Filed June 8, 1931  25 Sheets-Sheet 7

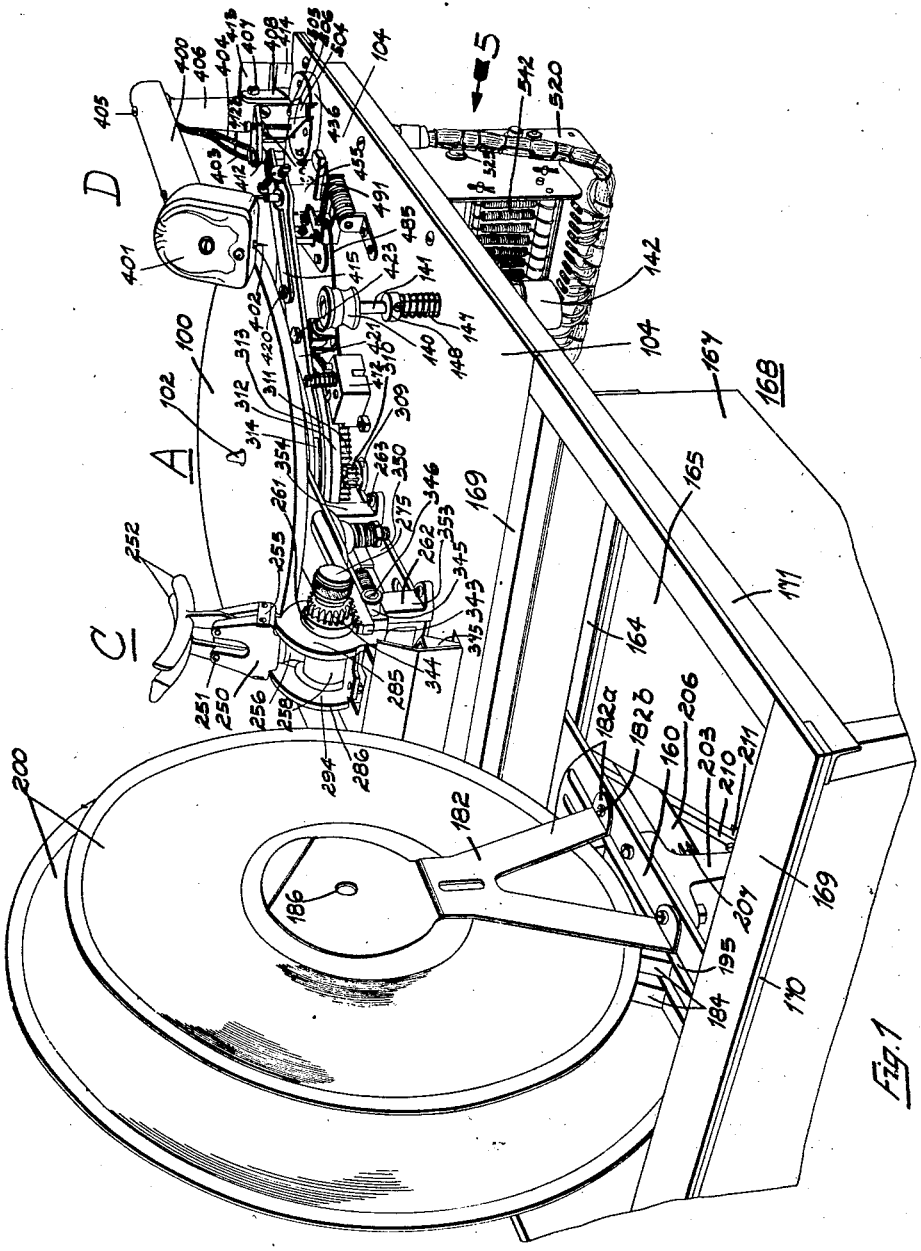

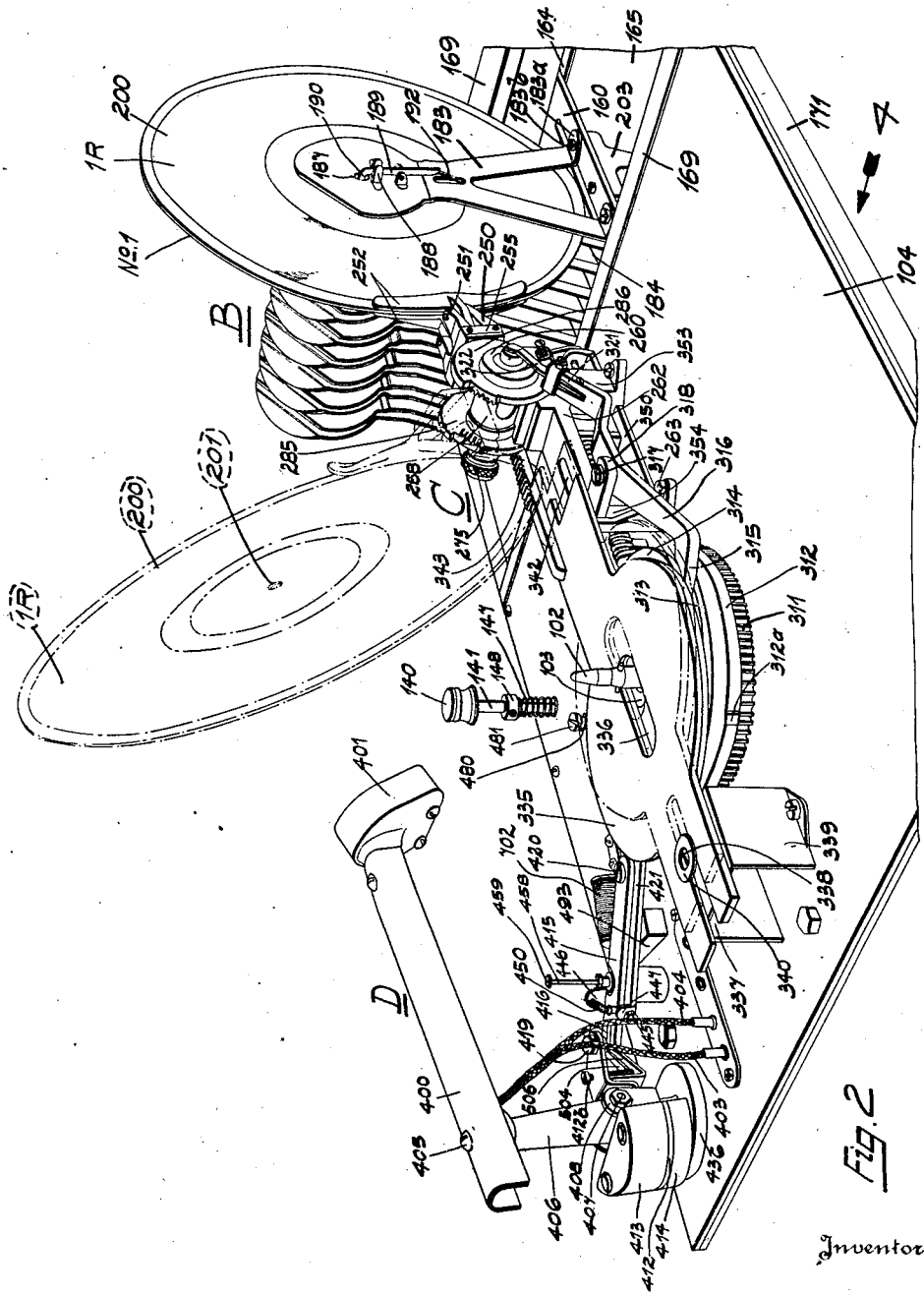

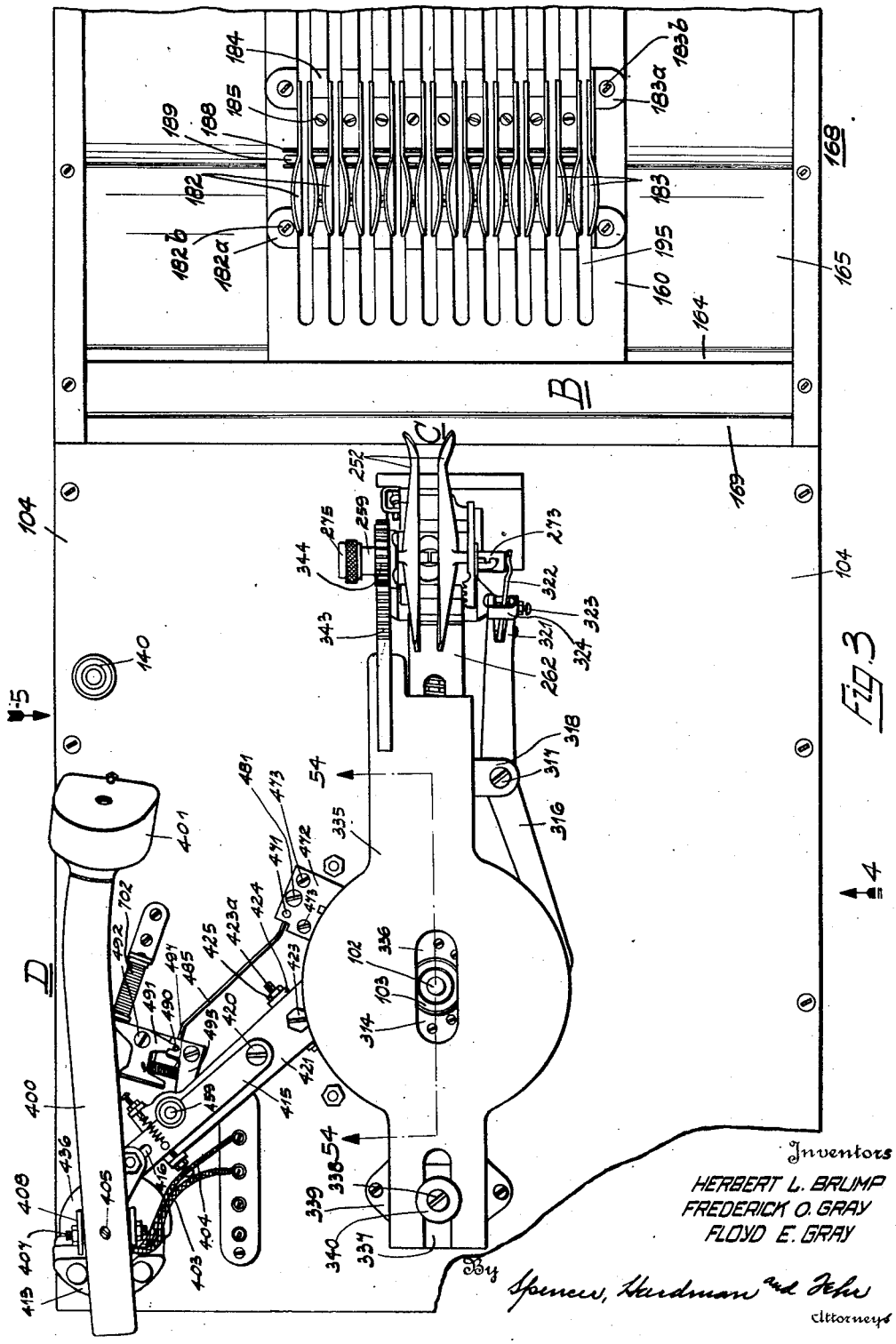

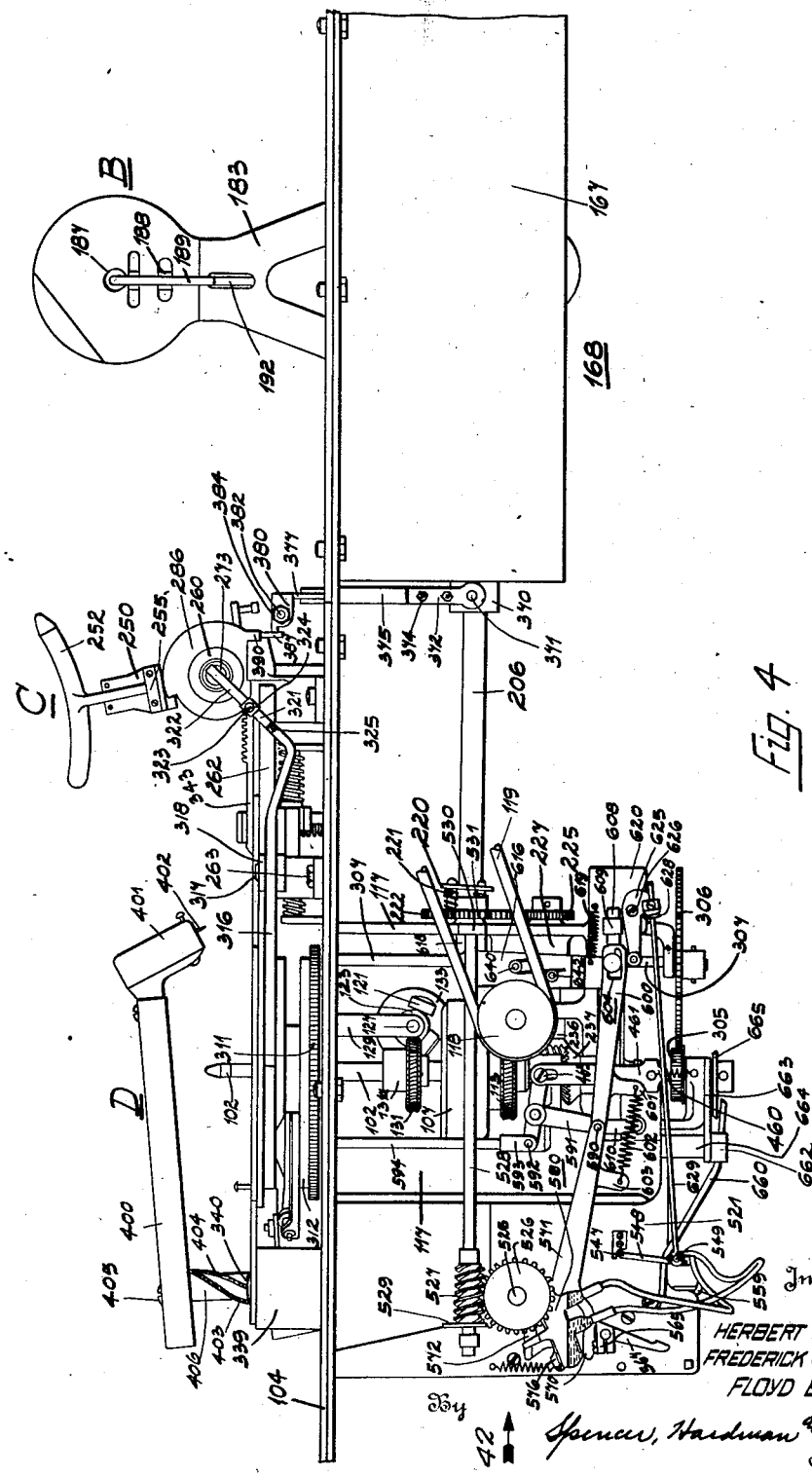

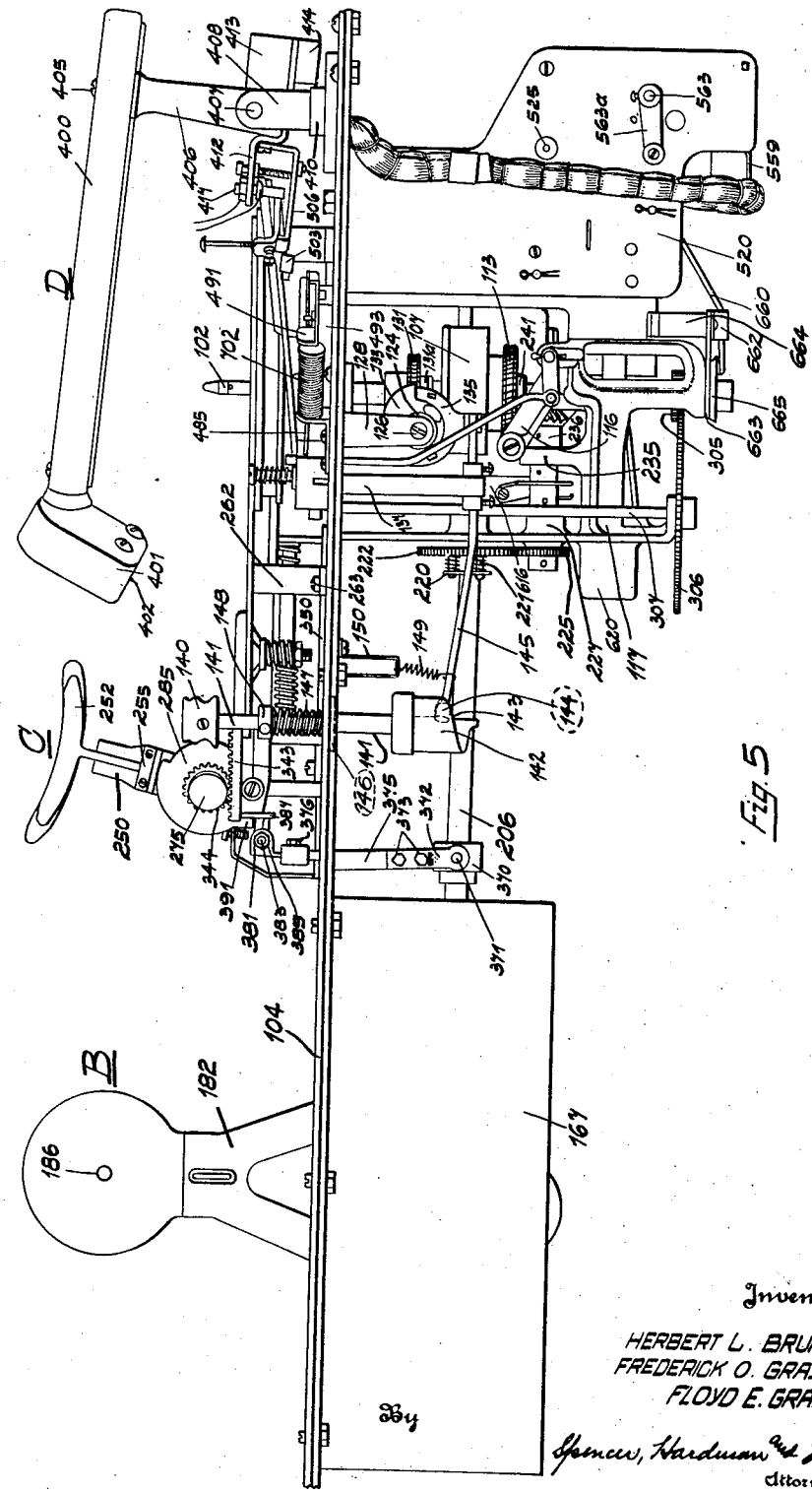

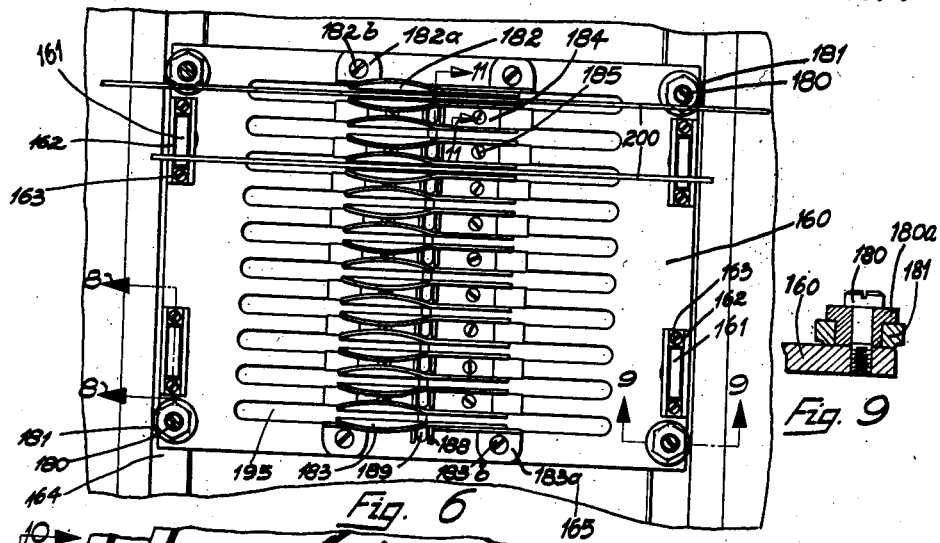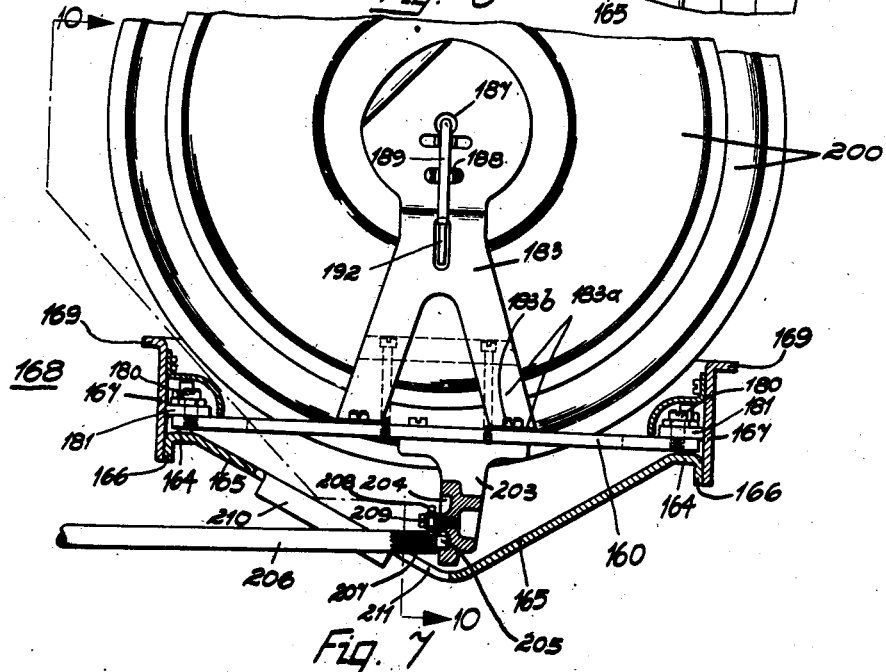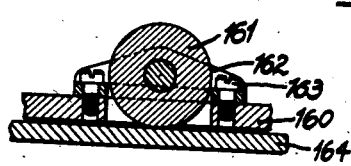

INVENTORS: HERBERT L. BRUMP
FREDERICK O. GRAY
FLOYD E. GRAY
By Spencer, Hardman and John
Attorneys

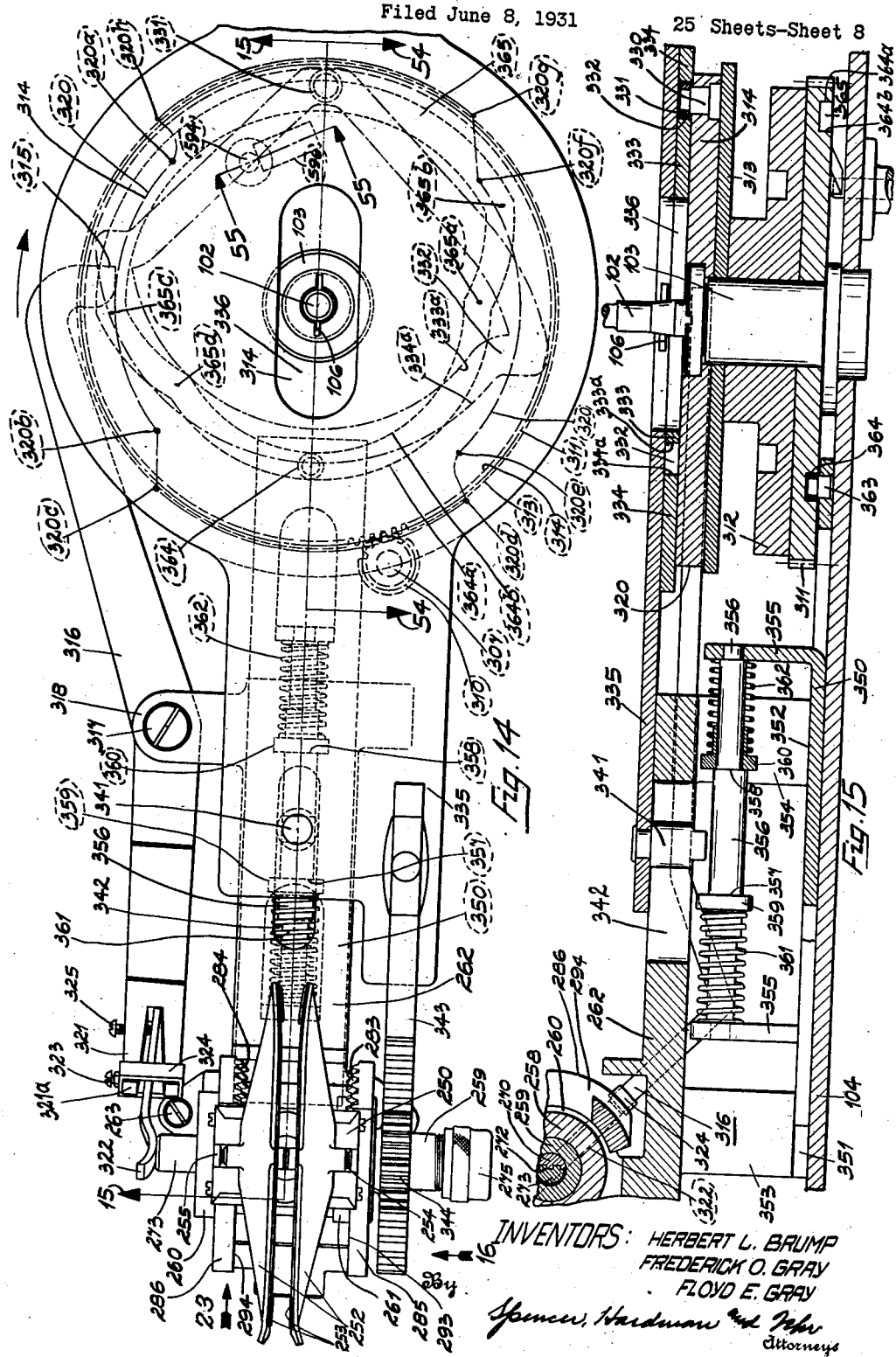

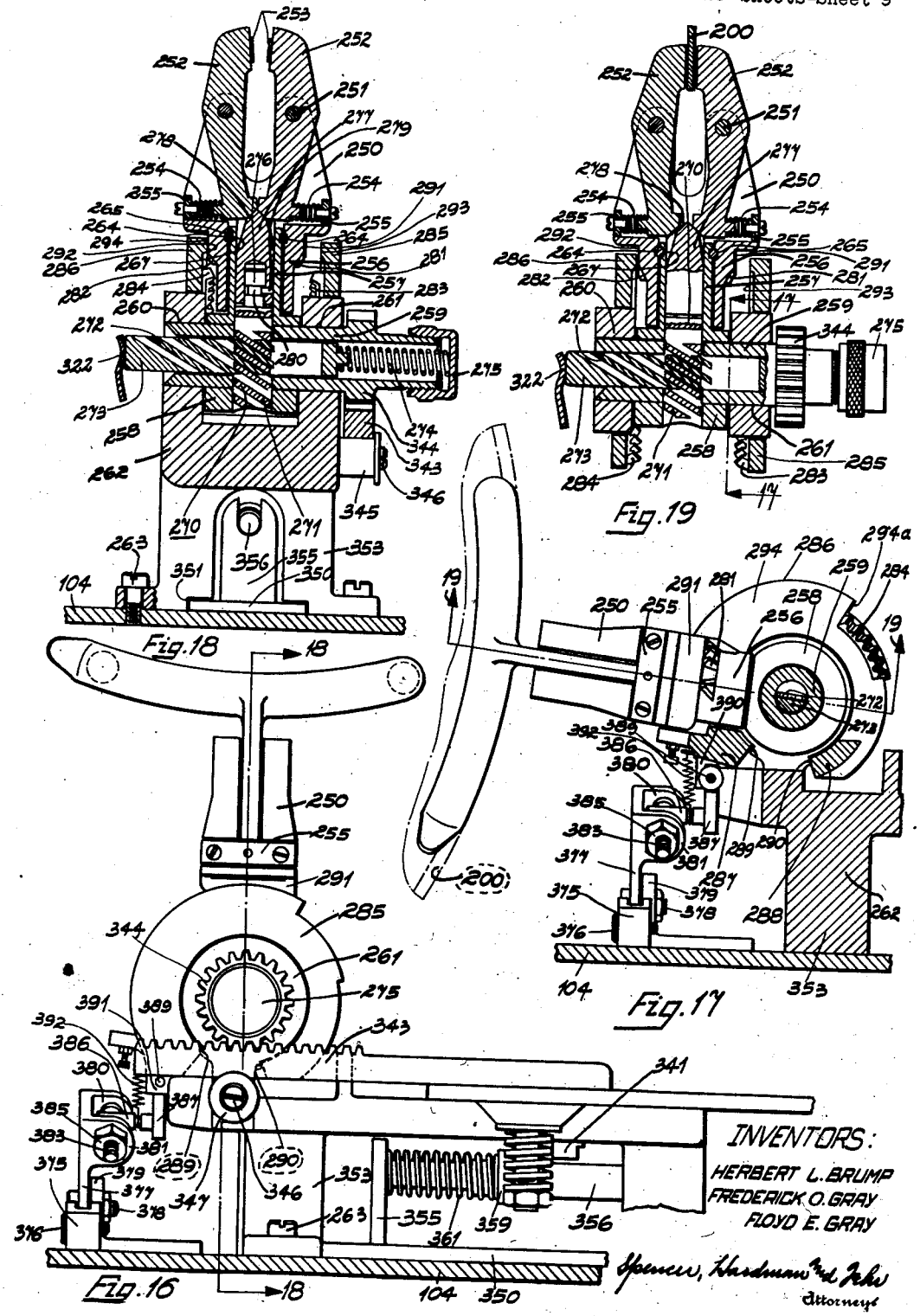

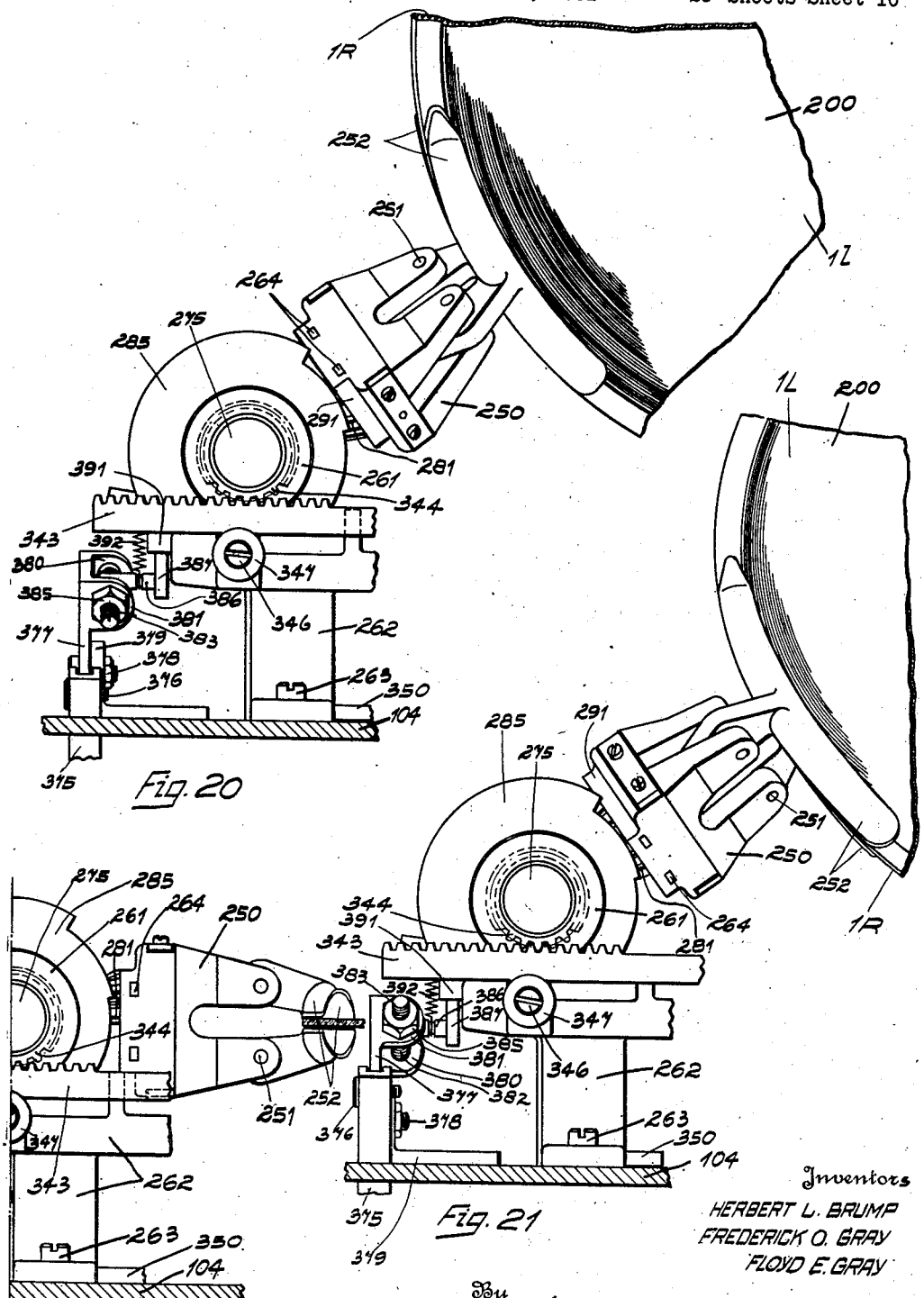

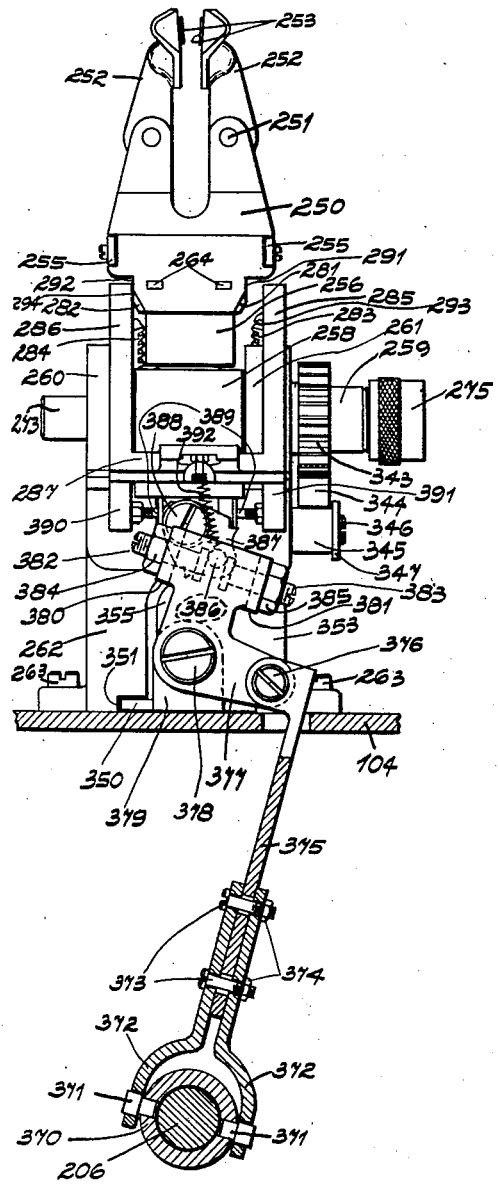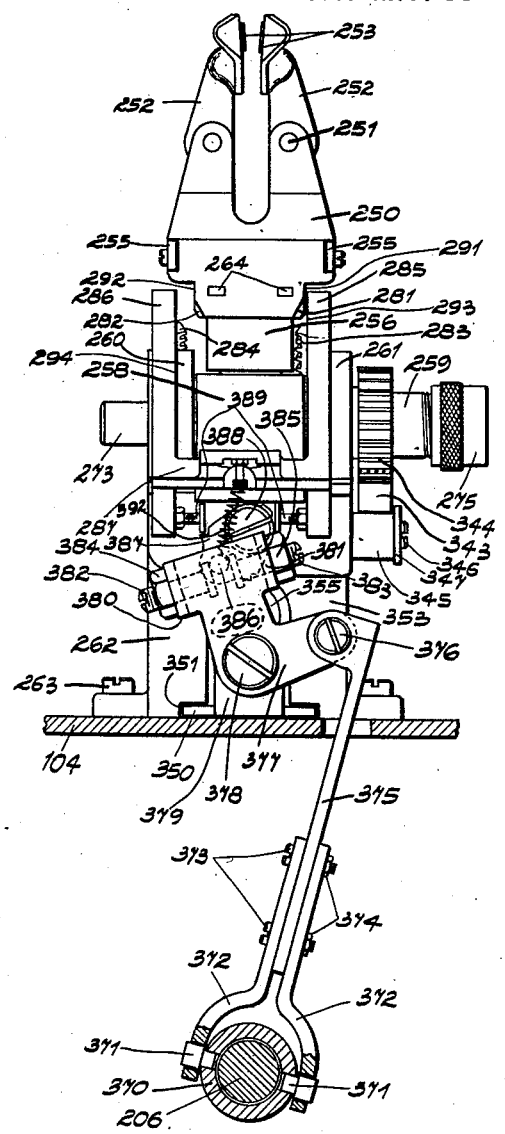

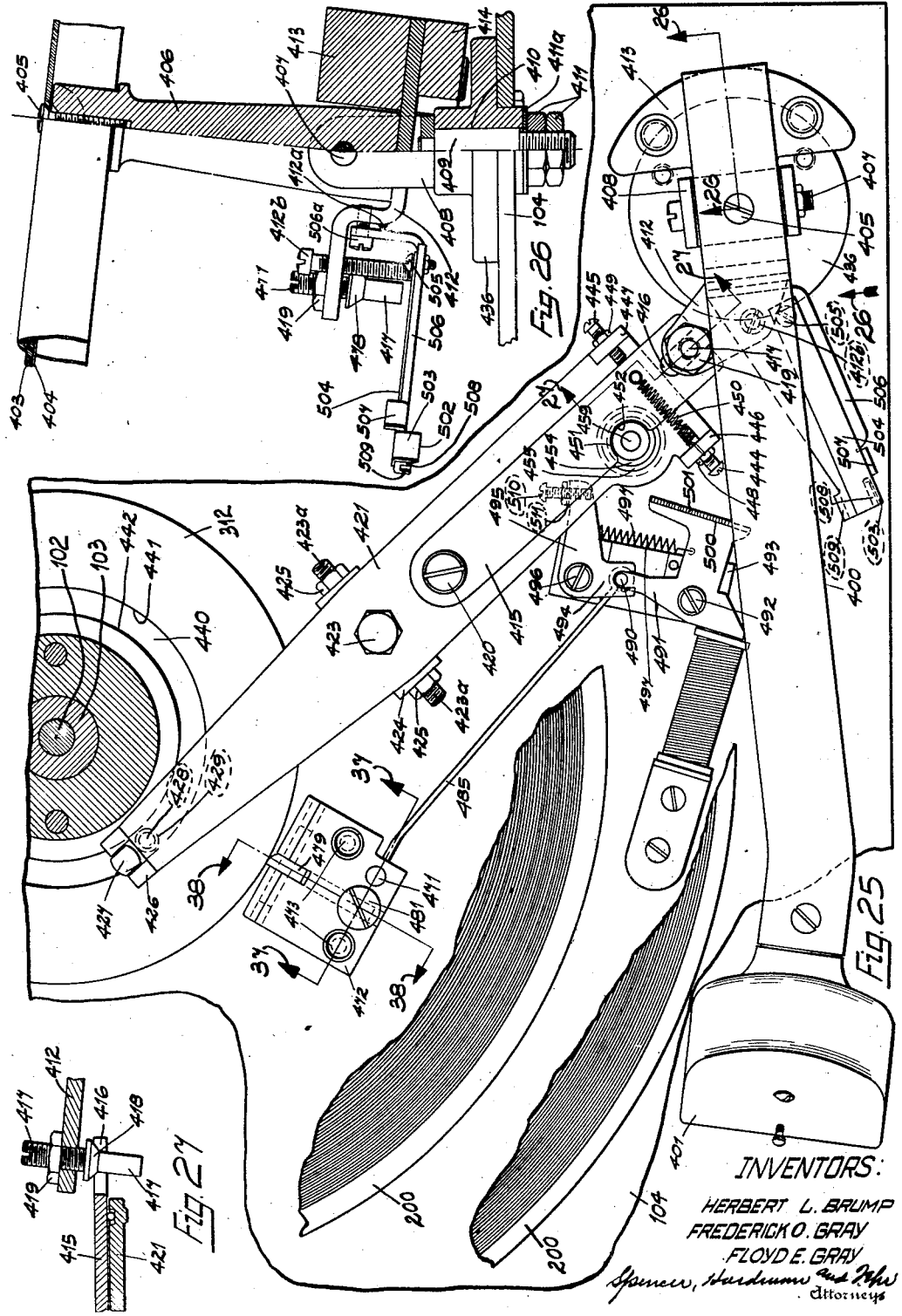

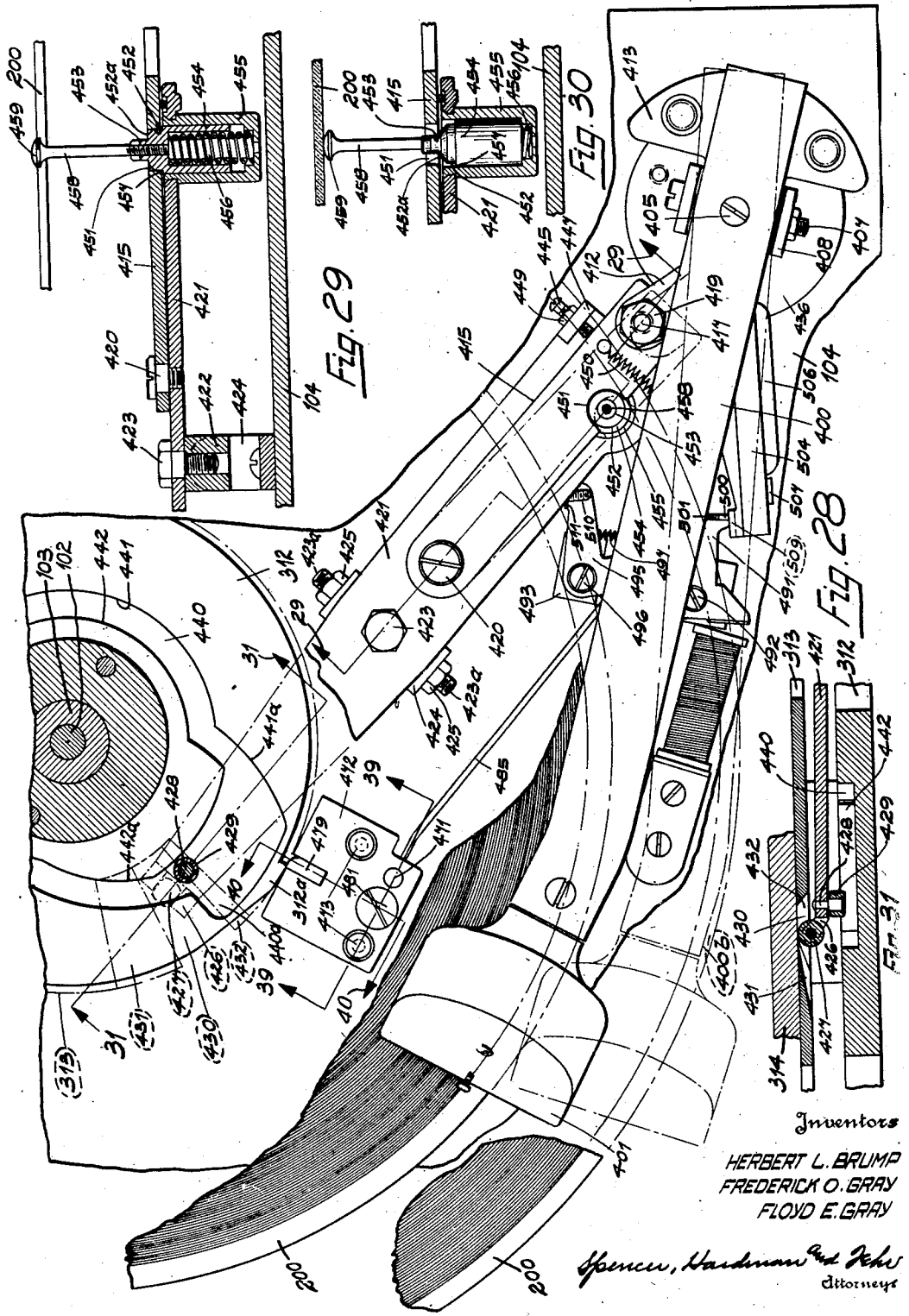

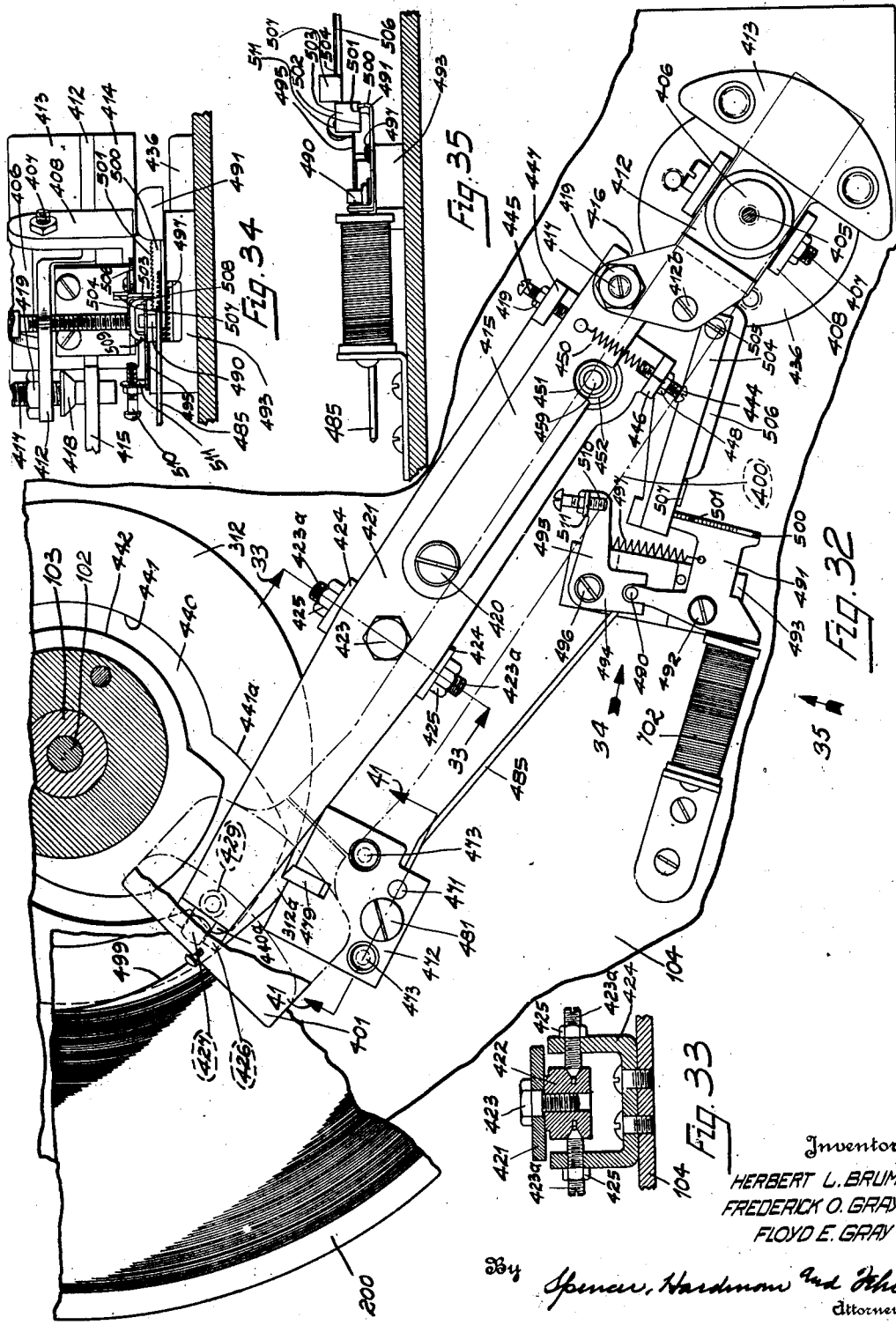

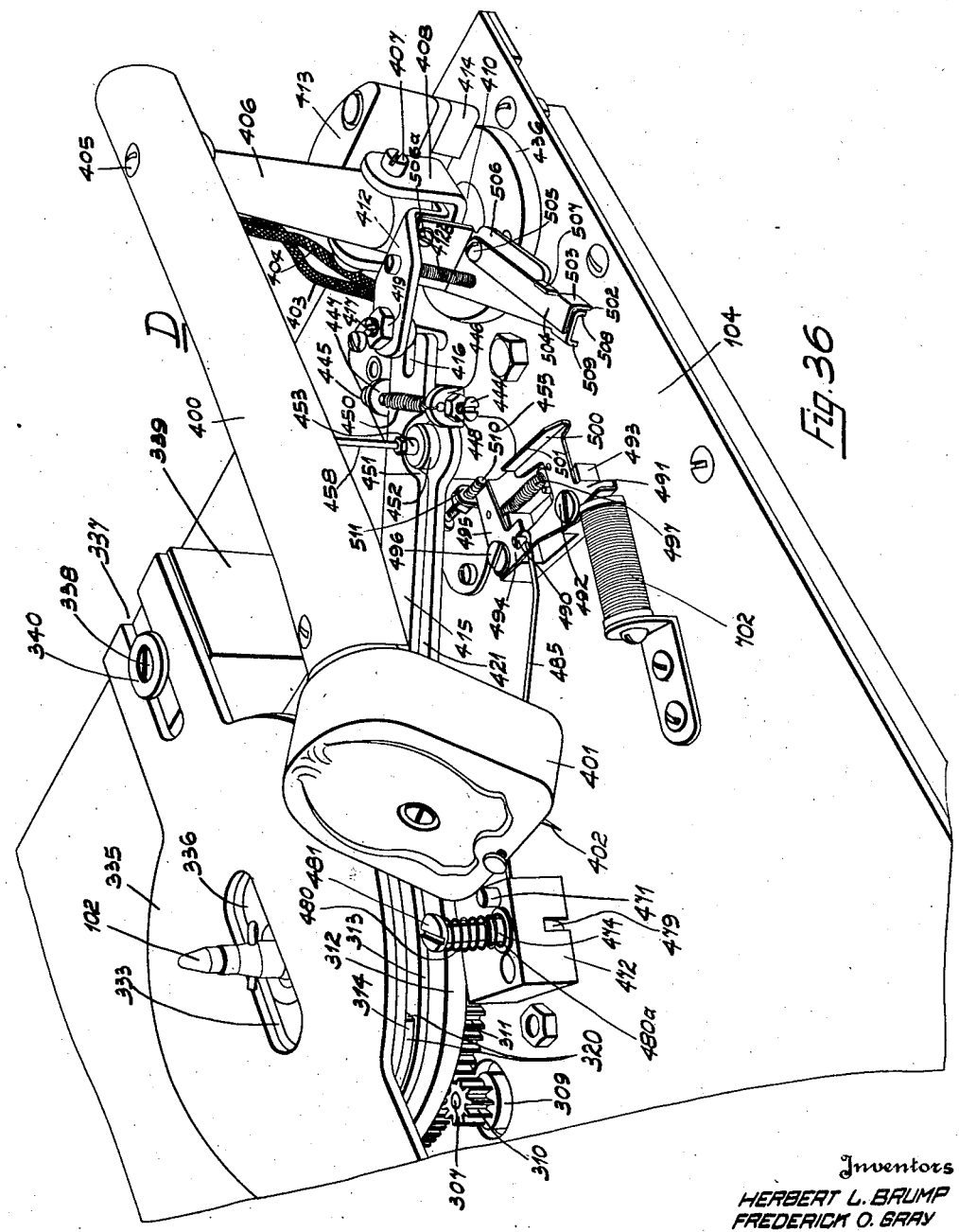

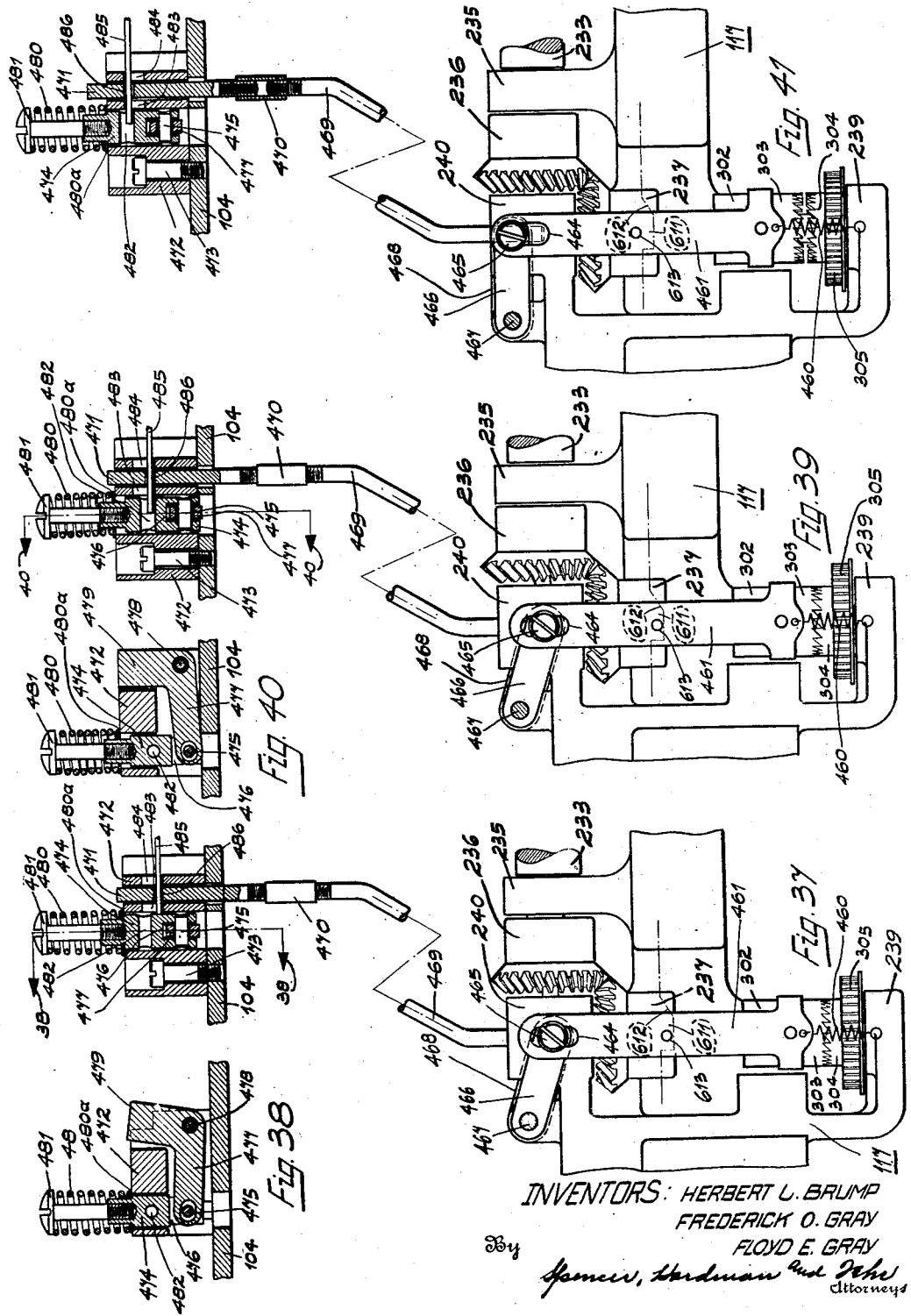

March 21, 1933. H. L. BRUMP ET AL 1,902,158
AUTOMATIC PHONOGRAPH
Filed June 8, 1931     25 Sheets-Sheet 17
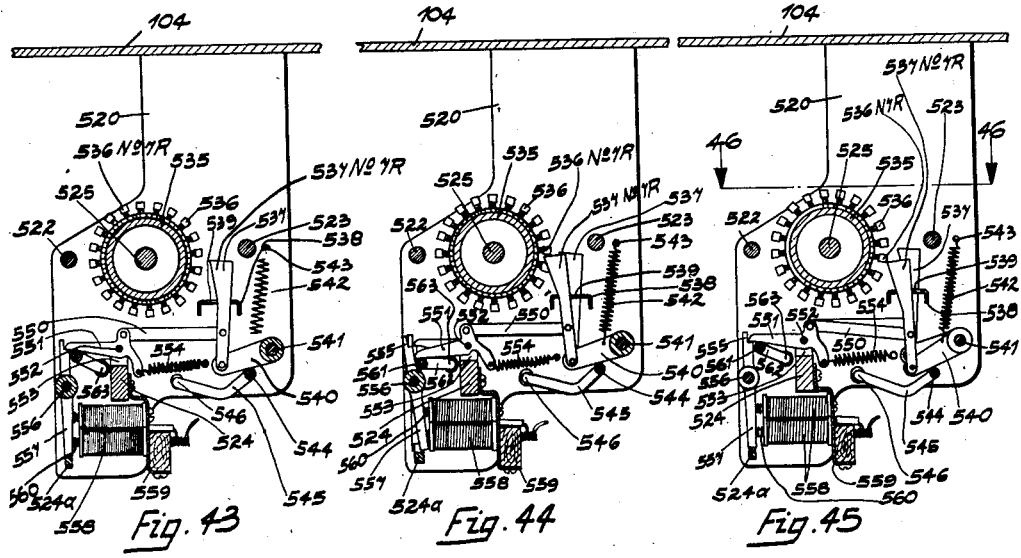
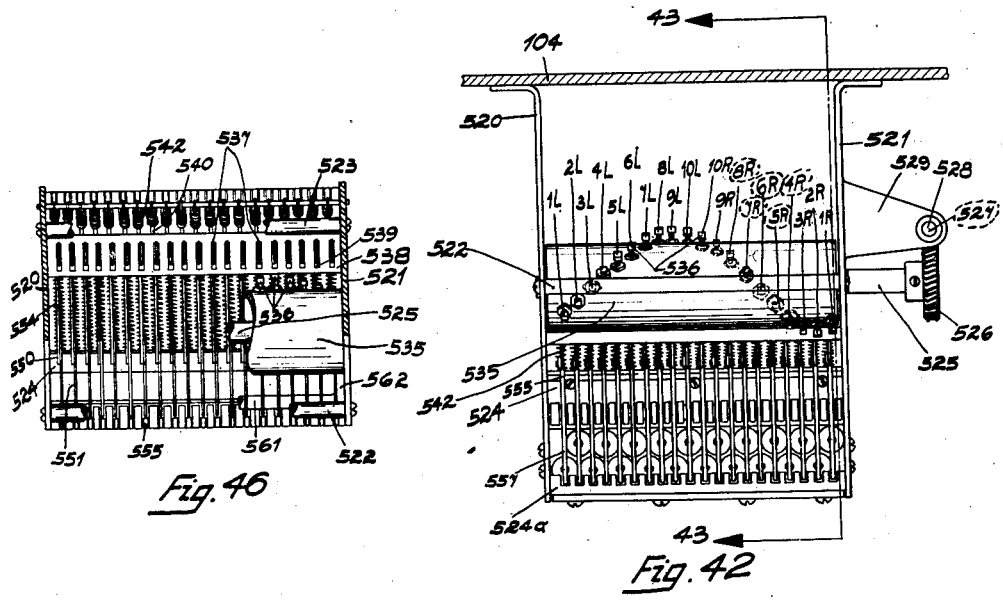
Inventors
HERBERT L. BRUMP
FREDERICK O. GRAY
FLOYD E. GRAY
Attorneys

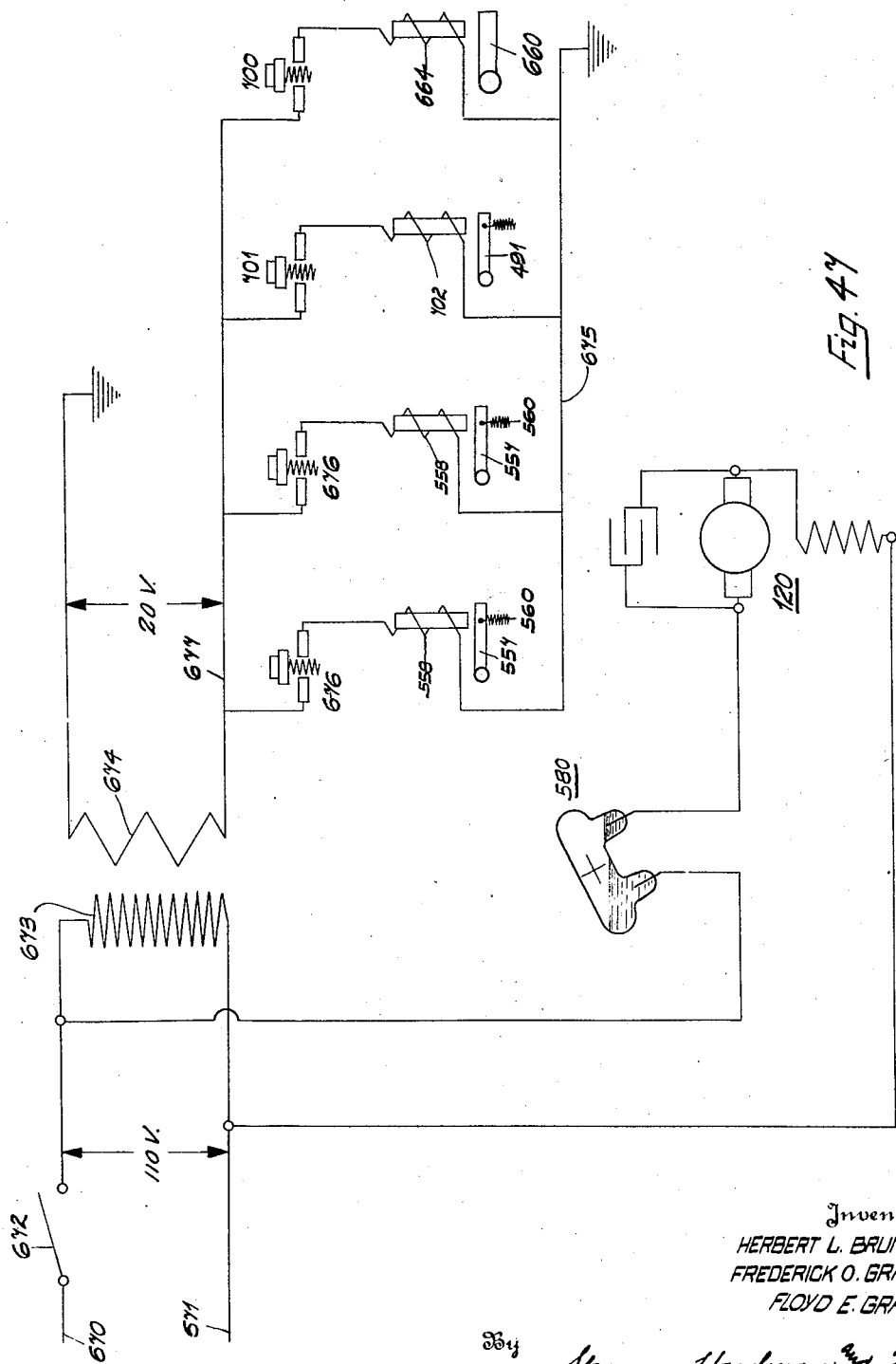

March 21, 1933.  H. L. BRUMP ET AL  1,902,158
AUTOMATIC PHONOGRAPH
Filed June 8, 1931  25 Sheets-Sheet 19

Inventors
HERBERT L. BRUMP
FREDERICK O. GRAY
FLOYD E. GRAY

By Spencer, Hardman and Fehr
Attorneys

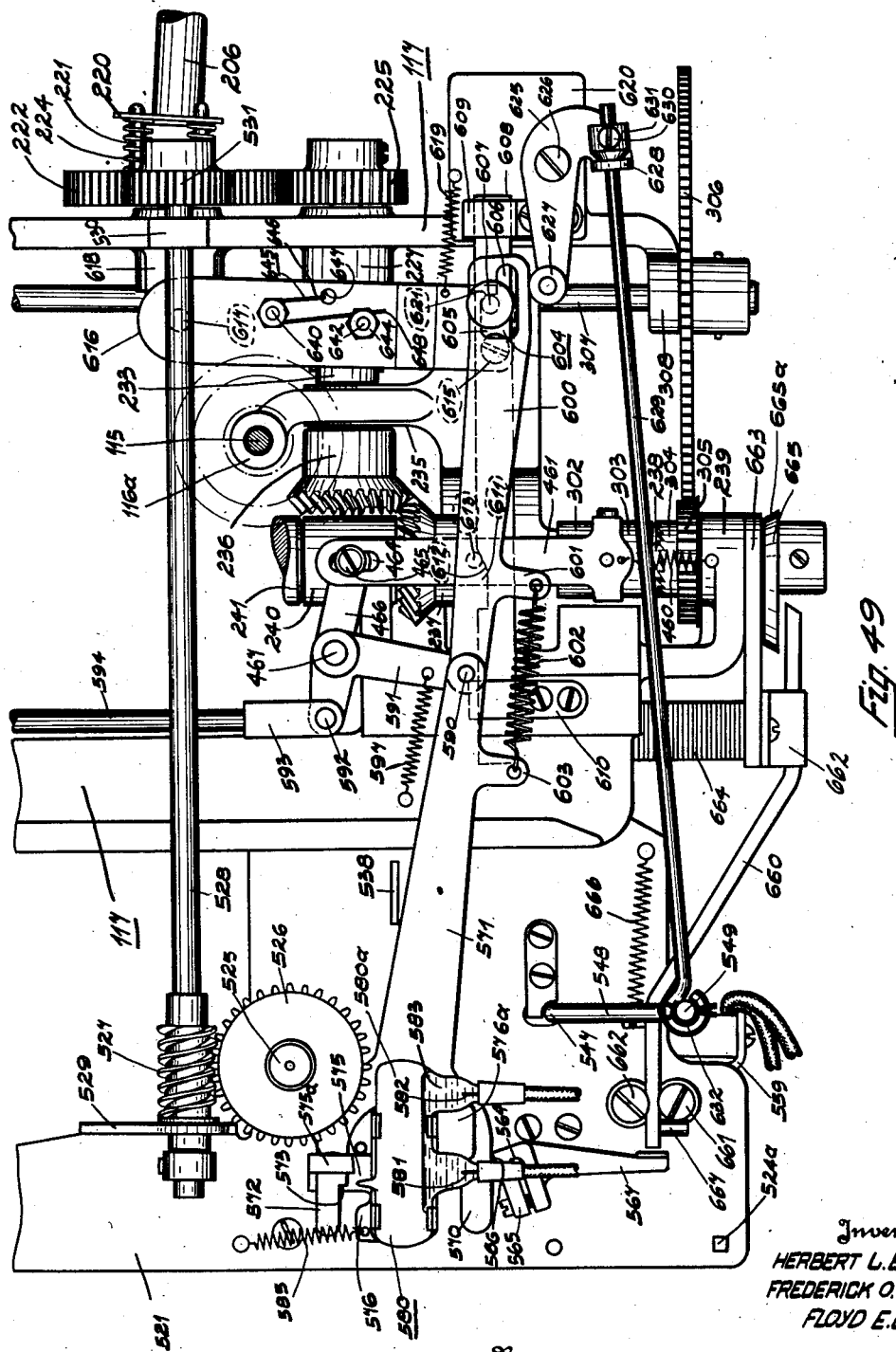

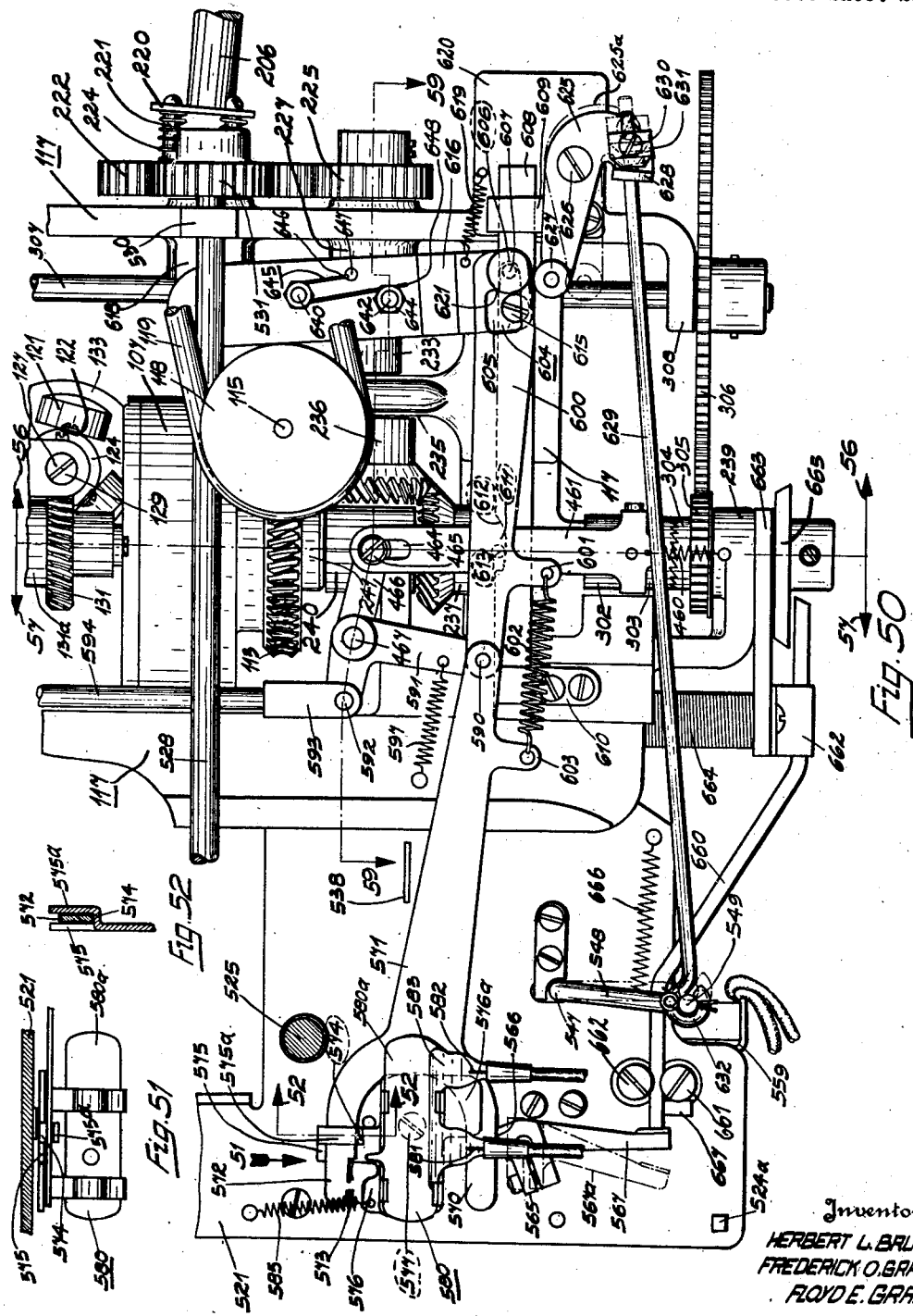

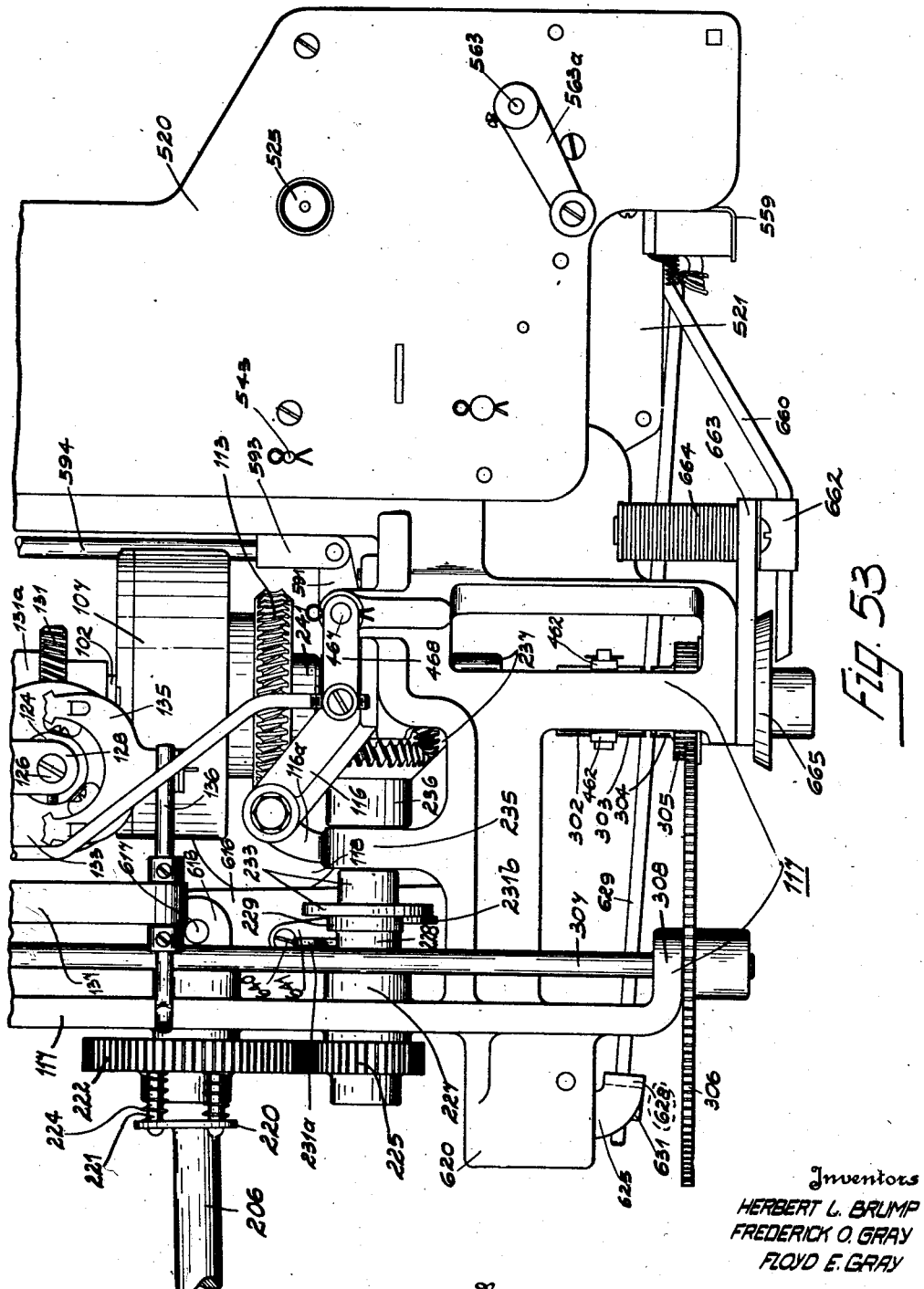

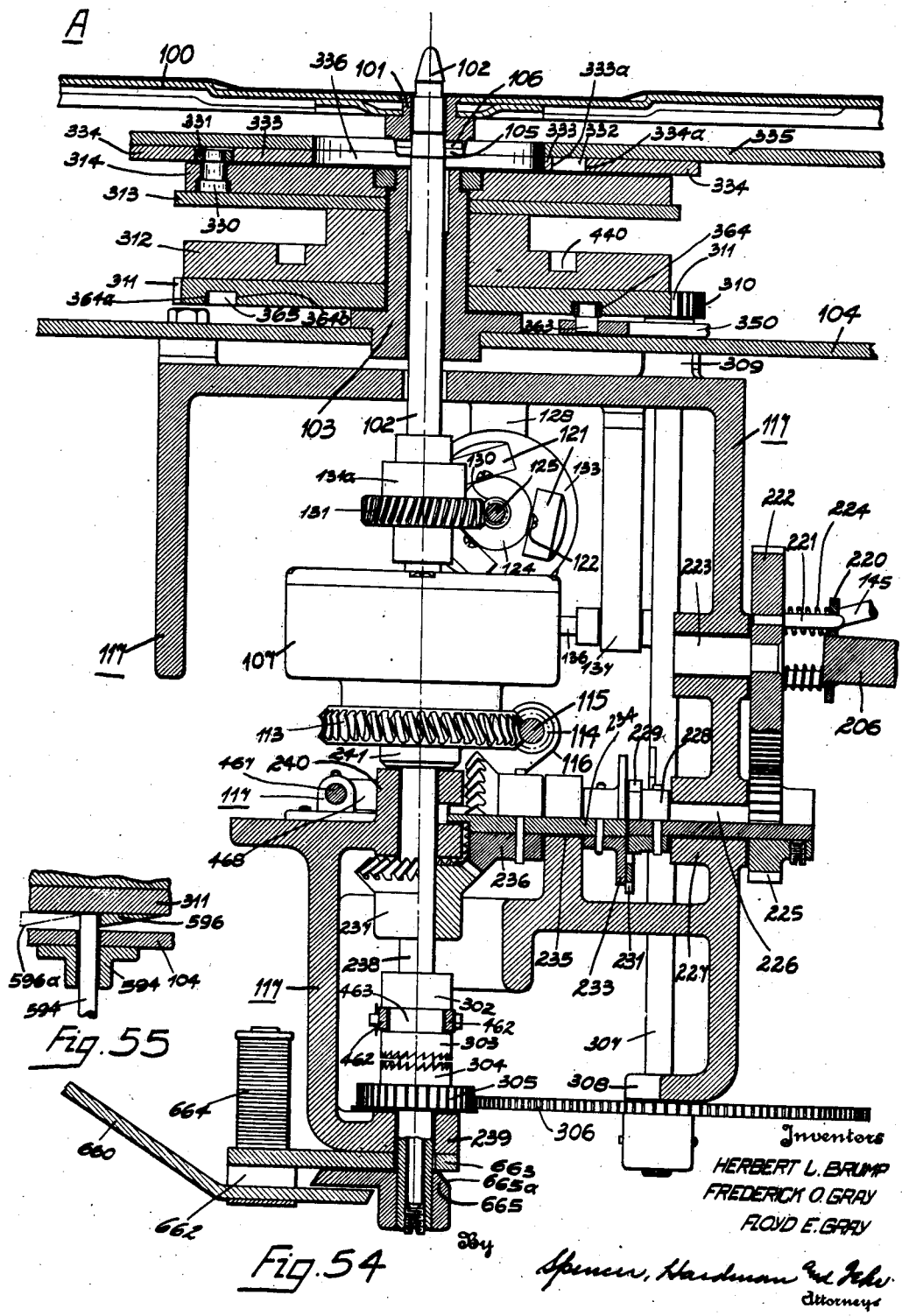

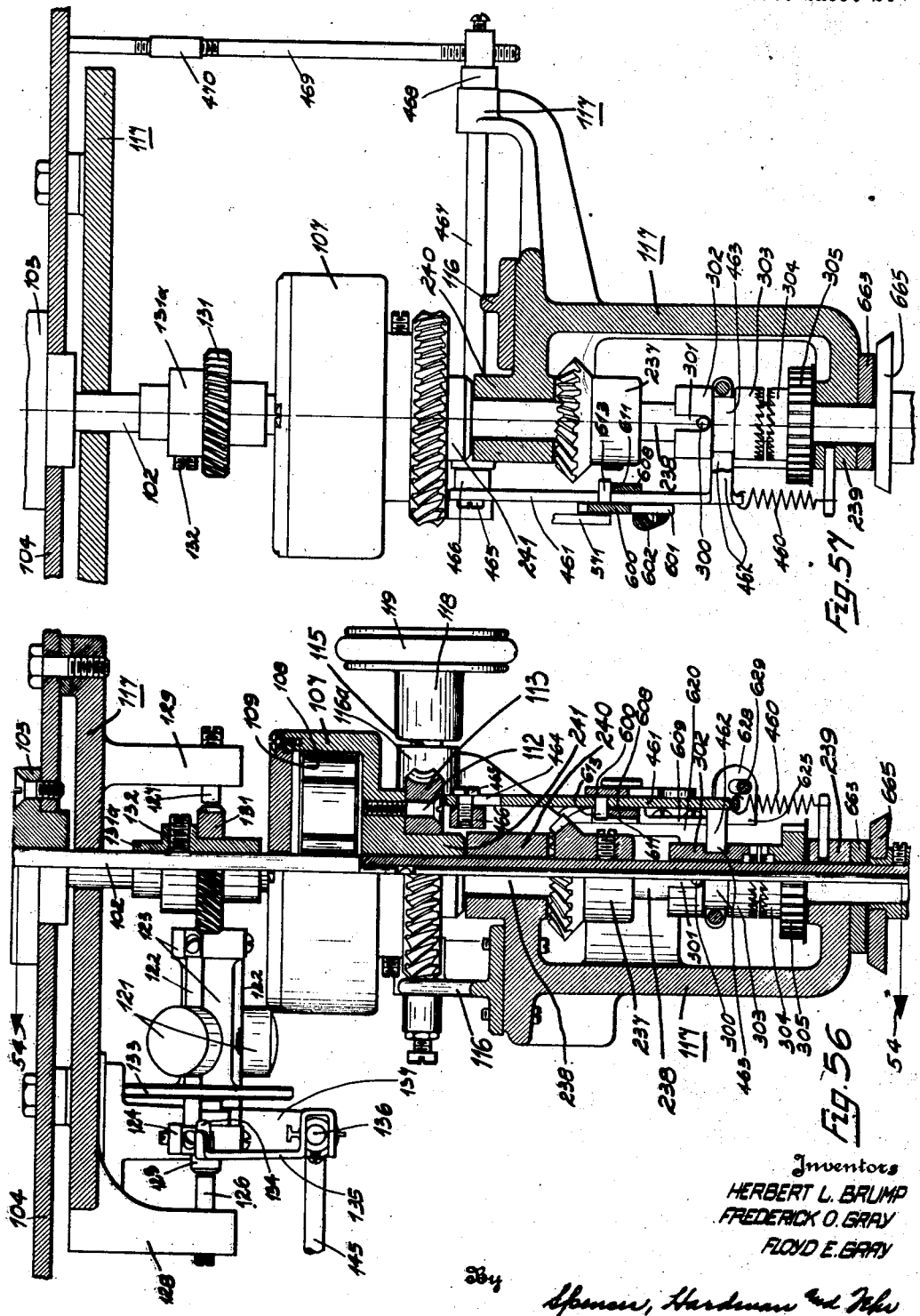

March 21, 1933. H. L. BRUMP ET AL 1,902,158
AUTOMATIC PHONOGRAPH
Filed June 8, 1931  25 Sheets-Sheet 25
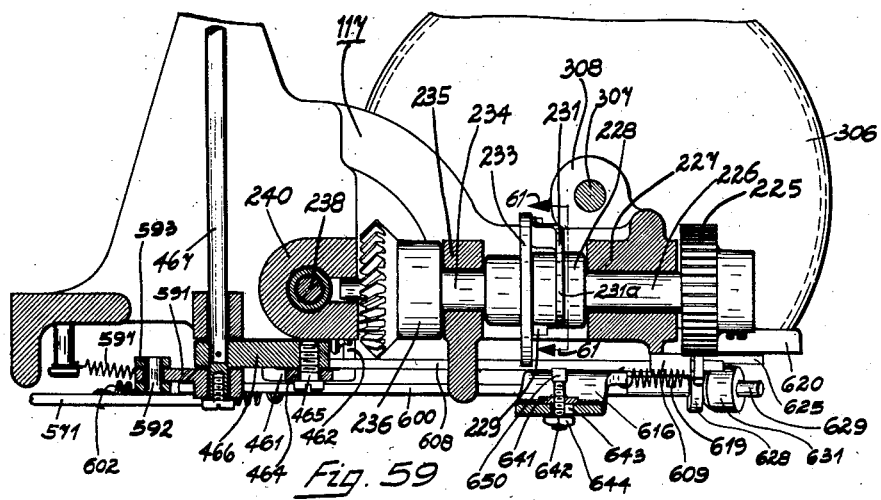
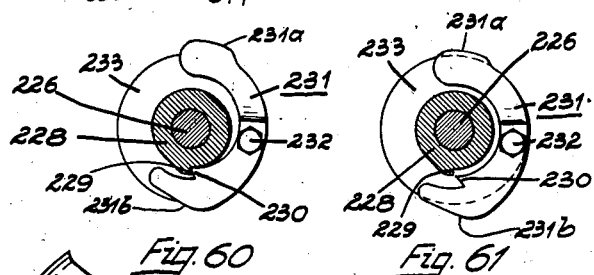
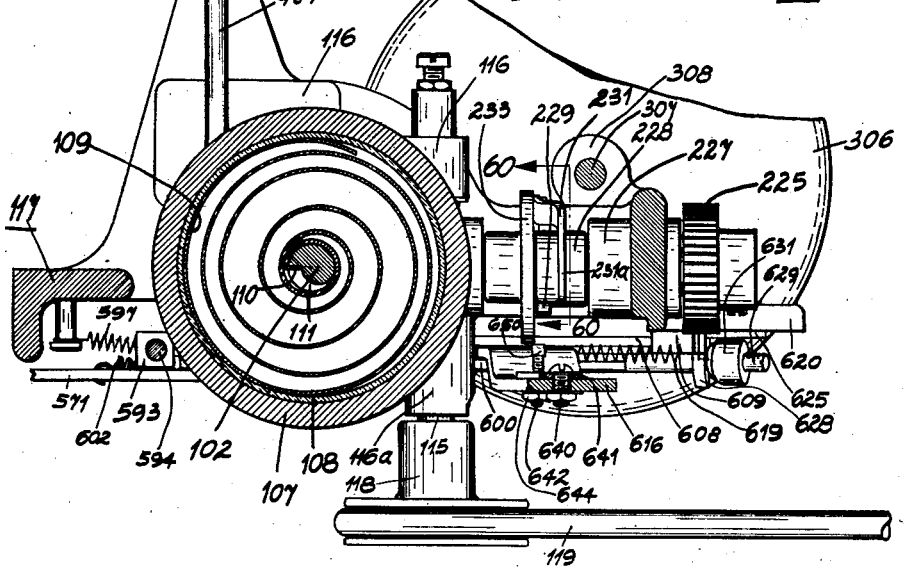
INVENTORS: HERBERT L. BRUMP
FREDERICK O. GRAY
FLOYD E. GRAY
Attorneys Patented Mar. 21, 1933

1,902,158

UNITED STATES PATENT OFFICE

HERBERT L. BRUMP, FREDERICK O. GRAY, AND FLOYD E. GRAY, OF DAYTON, OHIO, ASSIGNORS TO GENERAL MOTORS RADIO CORPORATION, OF DAYTON, OHIO, A CORPORATION OF OHIO

AUTOMATIC PHONOGRAPH

Application filed June 8, 1931. Serial No. 542,822.

This invention relates to automatic record changing phonographs and particularly to improvements in the type of phonograph having means for automatically selecting any record disc from a magazine and for automatically placing the disc upon the phonograph turn table either side up according to a predetermined selection of a record to be played.

A known form of automatic record changing phonograph of the type mentioned above comprises a record magazine which holds the records in vertical planes radiating from the vertical axis of the turn table shaft. Co-axially with the turn table shaft, there is a pivoted carriage which extends from the turn table shaft toward the records and carries a record gripping arm provided with record gripping fingers. The gripping arm is rotatable upon a horizontal axis so that the gripping fingers may be moved to a position to embrace the edge of a record and then, while the fingers grip the record, move the record out of the magazine to a position above the turn table. The record carrying arm is also pivotally mounted upon an axis at right angles to its horizontal axis so as to permit the turning of the record with the selected side up while the arm moves about its horizontal axis to place the record upon the turn table. This automatic phonograph also includes a remotely controlled, electrically operated record selecting device which controls the movement of the record gripper arm carriage pivotally about the axis of the turn table shaft so as to bring the record gripping fingers adjacent the edge of a record of predetermined selection and which controls the mechanism for actuating the record gripping arm for the purpose of turning the record either side up as selected as the arm places the record upon the turn table.

It is among the objects of the present invention to provide such improvements in this type of automatic phonograph as will provide for building the same with fewer parts and more especially for building it in more compact form so as to permit installing it in a relatively small cabinet. This aim of the invention is accomplished in the disclosed embodiment thereof by using a movable magazine carriage instead of a movable gripper arm carriage, thereby permitting the gripper arm, tone arm and operating mechanism therefor to remain bodily stationary relative to the axis of the turn table.

Further objects and advantages of the present invention will be apparent from the following description, reference being had to the accompanying drawings wherein a preferred embodiment of one form of the present invention is clearly shown.

In the drawings:

Fig. 1 is a perspective view of an automatic phonograph embodying the present invention, viewed looking across the record magazine and toward the turn table.

Fig. 2 is a perspective view of the machine looking across the mechanism which operates the record gripper arm and tone arm and toward the magazine, the turn table being omitted.

Fig. 3 is a plan view with the turn table removed.

Fig. 4 is a side elevation viewed in the direction of the arrow 4 in Figs. 2 and 3.

Fig. 5 is a side elevation viewed in the direction of the arrow 5 of Figs. 1 and 3.

Fig. 6 is a fragmentary plan view of the record carriage support and record carriage.

Fig. 7 is a sectional view on line 7—7 of Fig. 10.

Figs. 8 and 9 are sectional views taken respectively on lines 8—8 and 9—9 of Fig. 6.

Figure 10:
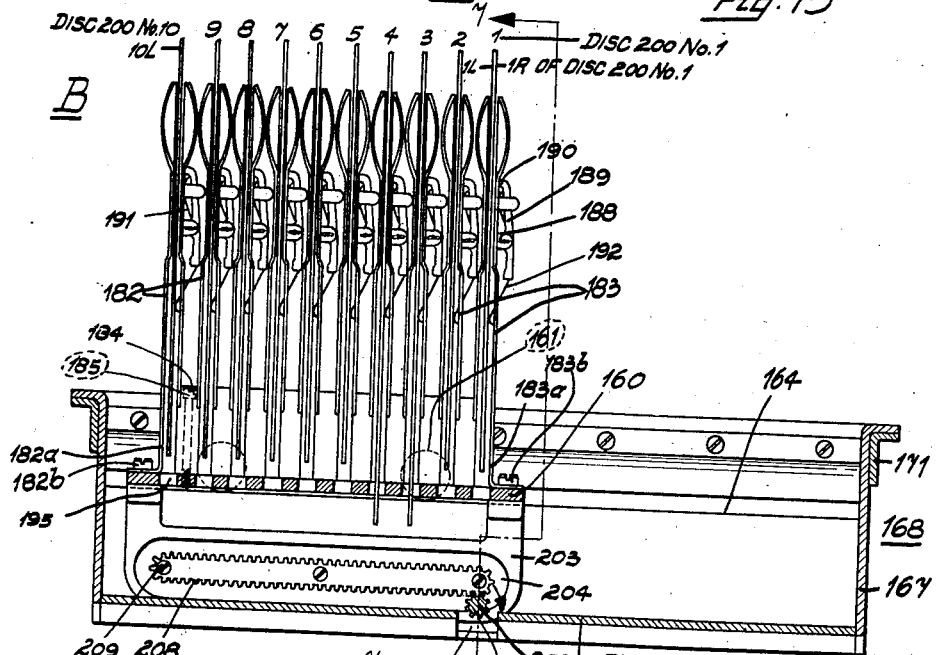

Fig. 10 is a sectional view taken on the line 10—10 of Fig. 7.

Figure 11:
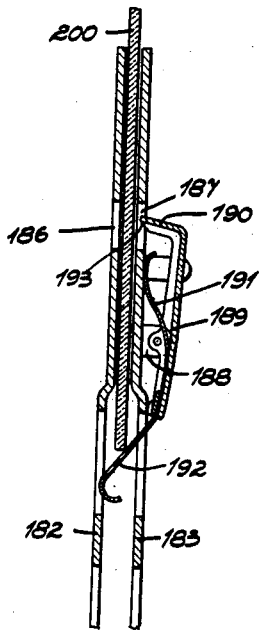
Figure 12:
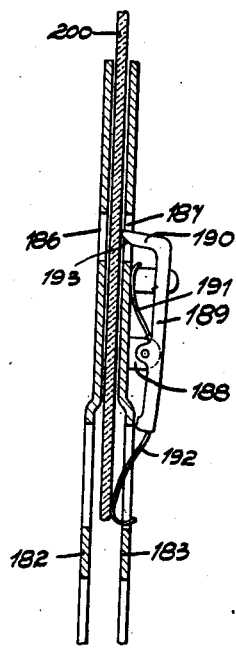
Figure 13:
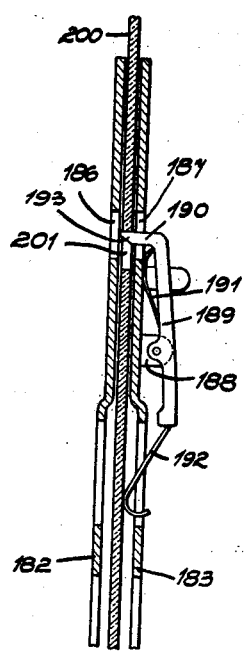

Figs. 11, 12 and 13 are sectional views taken on the line 11—11 of Fig. 6 and show the operation of placing a record upon a record holder of the magazine carriage.

Fig. 14 is a plan view on a large scale of the record gripper arm and its operating mechanism.

Fig. 15 is a sectional view on line 15—15 of Fig. 14.

Fig. 16 is a fragmentary side elevation looking in the direction of arrow 16 of Fig. 14.

Fig. 17 is a fragmentary side elevation of the record gripping arm turned into position for gripping a record, certain parts being shown in section taken on the line 17—17 of Fig. 19.

Fig. 18 is a sectional view on the line 18—18 of Fig. 16.

Fig. 19 is a sectional view on the line 19—19 of Fig. 17.

Fig. 20 is a fragmentary side elevation similar to Fig. 16 showing the record gripper arm in one of its positions while being turned to place upon the turn table the record No. 1 shown in Fig. 2 with record side 1R uppermost.

Fig. 21 is a view similar to Fig. 20 showing the record gripping arm in a position while being turned to place record No. 1 with record side 1L upon the turn table.

Fig. 22 is a fragmentary side view showing the record gripper arm in position after the record has been placed upon the turn table.

Fig. 23 is an end elevation of the record gripper arm and gripper arm carriage viewed in the direction of arrow 23 of Fig. 14, said gripper arm operating mechanism being conditioned so that the right hand side (as viewed in Fig. 2) of any record disc selected will be placed upon the turn table.

Fig. 24 is a view similar to Fig. 23 showing the record gripper arm operating mechanism conditioned for causing the arm to place any record disc with its left hand side up as viewed in Fig. 2.

Fig. 25 is an enlarged scale plan view of the tone arm and control mechanism therefore.

Fig. 26 is a fragmentary side elevation viewed in the direction of the arrow 26 of Fig. 25, the part shown in section being a section on section line 26—26 of Fig. 25.

Fig. 27 is a fragmentary sectional view on line 27—27 of Fig. 25.

Fig. 28 is a view similar to Fig. 25 showing the tone arm in position for engaging the start portion of the record track.

Fig. 29 is a fragmentary sectional view on the line 29—29 of Fig. 28 showing a portion of the tone arm control conditioned for operation when a ten inch or smaller record is placed upon the turn table.

Fig. 30 is a fragmentary view of part of the control mechanism shown in Fig. 29 conditioned for operation when a twelve inch record is placed on the turn table.

Fig. 31 is a fragmentary sectional view on the line 31—31 of Fig. 28.

Fig. 32 is a view similar to Figs. 25 and 28 and shows the position of the tone arm after the needle has passed the end of the record track and has moved into the eccentric track whereby the tone arm is caused to oscillate and to operate a retrieving mechanism.

Fig. 33 is a sectional view on the line 33—33 of Fig. 32.

Figs. 34 and 35 are fragmentary elevations viewed respectively along the direction of arrows 35 and 34 of Fig. 32.

Fig. 36 is a perspective view of the tone arm and control.

Fig. 37 is a fragmentary side elevation of a clutch control and a clutch for drivingly connecting a power shaft with cams for actuating the record gripper arm and the tone arm. In this figure the clutch control is in position occupied while the cams are still rotating but before the tone arm has been moved into position for playing a record. The part shown in section is a section view on line 37—37 of Fig. 25.

Fig. 38 is a sectional view on lines 38—38 of Figs. 25 and 37.

Fig. 39 is a view similar to Fig. 37 showing the condition of the clutch and control mechanism just before the gripper arm and tone arm control cams stop rotating or just before starting to play a record. The part shown in section in Fig. 39 is a sectional view on the line 39—39 of Fig. 28.

Fig. 40 is a sectional view on the line 40—40 of Figs. 28 and 39.

Fig. 41 is a view similar to Figs. 37 and 39 showing the clutch disengaged and the clutch control mechanism in the position shown in Fig. 32. The part shown in section in this view is a section taken on line 41—41 of Fig. 32. Fig. 41 shows the position of the clutch and control mechanism during the playing of a record or during the movement of the tone arm from the position shown in Fig. 28 to the position shown in Fig. 32.

Fig. 42 is a side elevation of the record selector control viewed in the direction of the arrow 42 of Fig. 4.

Fig. 43 is a sectional view on the line 43—43 of Fig. 42, and shows the selector control in normal position.

Fig. 44 is a view similar to Fig. 43 showing a selector drum stop arm after having been released by one of the electro-magnets and located in position for stopping the drum.

Fig. 45 is a view similar to Fig. 44 showing the movement of a selected drum stop arm by selector drum screw in position before the selector drum stops rotating.

Fig. 46 is a sectional view on line 46—46 of Fig. 45.

Fig. 47 is a wiring diagram showing the electrical circuits of the machine.

Figure 48:
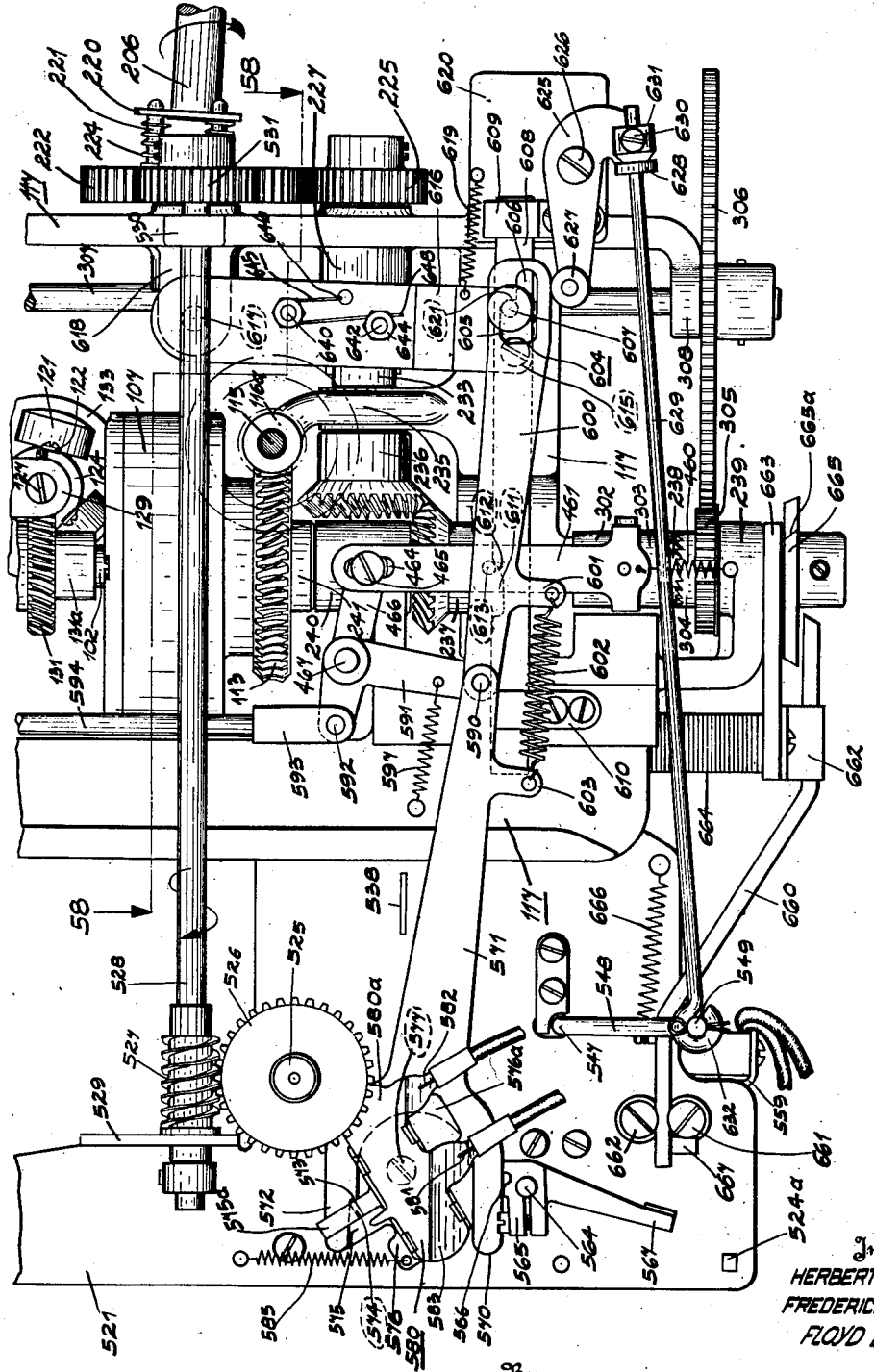

Fig. 48 is an enlarged scale view of part of the control mechanism shown in side elevation in Fig. 4 and shows the control in normal or at rest position.

Fig. 49 is a view similar to Fig. 48 showing the control mechanism in position while the record magazine is being shifted.

Fig. 50 is a view similar to Fig. 49 showing the control mechanism in position after the record magazine has been shifted and while the record gripper arm is being moved and while the tone arm is thereafter moved into position for playing a record.

Fig. 51 is a fragmentary plan view looking in the direction of arrow 51 of Fig. 50.

Fig. 52 is a fragmentary sectional view on the line 52—52 of Fig. 50.

Fig. 53 is a fragmentary side elevation on a large scale of a portion of the mechanism shown in Fig. 5.

Fig. 54 is a fragmentary vertical sectional view taken on the line 54—54 of Figs. 3 and 14.

Fig. 55 is a fragmentary sectional view on the line 55—55 of Fig. 14.

Fig. 56 is a sectional view on the line 56—56 of Fig. 50.

Fig. 57 is a fragmentary sectional view on the line 57—57 of Fig. 50.

Fig. 58 is a fragmentary sectional view on the line 58—58 of Fig. 48.

Fig. 59 is a fragmentary sectional view on the line 59—59 of Fig. 50.

Fig. 60 is a fragmentary sectional view on the line 60—60 of Fig. 58.

Fig. 61 is a fragmentary sectional view on the line 61—61 of Fig. 59.

This automatic phonograph comprises the following devices and mechanism which will be described in the order mentioned:—a record playing table A; a movable record magazine B; a record gripper arm C for transferring a selected record disc from the magazine B to the table A either side up according to a predetermined selection, and the gripper arm operating mechanism; a tone arm D and its operating mechanism; and the automatic control of the operation of the machine for (1) the automatic selection of a predetermined record and placing the record disc the proper side up upon the turn table, (2) movement of the tone arm into record playing position, (3) withdrawal of the tone arm after playing the record and return of tone arm to normal position, (4) the stopping of the machine after one selected record has been played, (5) repetition of the cycle of operation of the machine in case more than one record has been selected, (6) the stopping of the machine after all the selected records have been played, (7) the stopping of the playing of any record after the playing thereof has been started, and (8) the cancellation of the selection of all records resulting in the stopping of the machine.

*Record turn table and operation mechanism*

Referring more particularly to Figs. 1 and 54 the record table A comprises a disc 100 whose hub 101 is received by spindle 102 journalled in a bearing 103 supported by table 104. The hub 101 has notches 105 for receiving the ends of a driving pin 106 passing through the spindle 102. Referring to Fig. 58 the spindle 102 is frictionally driven through a clutch shell 107 having a friction lining 108 along which a spiral spring 109 drags. The inner end of the spiral spring is bent over at 110 and is received by a notch 111 provided by the spindle 102. The shell 107 is rotated in a clockwise direction, therefore, motion is transmitted to the shaft 102 by the spring 109 to the shaft in this direction. Referring to Fig. 56, the shell 107 is fastened by screws 112 to a worm gear 113 meshing with a worm 114 driven by shaft 115 which is journalled in a bearing bracket 116 supported by a frame 117 suspended from the table 104 and a bracket 116a provided by said frame 117. The shaft 115 carries a pulley 118 driven by belt 119 connected with a similar pulley operated by an electric motor indicated diagrammatically in 120 in Fig. 47.

The speed of the spindle 102 is governed by flyball governor comprising weights 121 each mounted on a leaf spring 122 fixed at its ends to a sleeve 123 slidable along shaft 125 and to a collar 124 fixed to the shaft 125. Shaft 125 is journalled on pivot screws 126 and 127 carried respectively by bracket arms 128 and 129 suspended from the frame 117. The shaft 125 carries a helical gear 130 meshing with a helical gear 131 pressfitted upon a hub 131a which is attached to the shaft 102 by a screw 132. As the speed of the shaft 125 increases the weights 121 fly outwardly thus causing the springs 122 to bow outwardly from the shaft 125 thereby causing the sleeve 123 to move toward the collar 124 and thus causing a disc 133 fastened to the sleeve 123 to move into engagement with friction fingers 134 carried by a bracket 135 fixed to a shaft 136 pivoted upon a bracket 137 suspended from the frame 117. The governor is controlled by manually moving the fingers 134 toward or away from the friction disc 133. This is accomplished by turning a knob 140 located above the table 104 and fixed to a shaft 141 carrying at its lower end a drum cam 142 whose lower helical camming surface 143 is engaged by a follower 144 carried by an arm 145 which extends from the shaft 136. Rotation of the shaft 141 is frictionally resisted by friction collar 146 carrying against the underside of the table 104 and fixed to the shaft 141. Friction pressure is applied by spring 147 which bears down against the table 104 and upwardly against a collar 148 attached to the shaft 141. The follower 144 is held against the cam 143 by a spring 149 attached at one end to the arm 145 and to a bracket 150 suspended by the table 104.

*Record magazine and operating mechanism*

The record magazine designated B in Fig. 1 comprises a carriage 160 provided with trunnions 161 which are pivoted upon bracket 162 attached by screws 163 to the carriage 160. The trunnions 161 ride along the horizontal flanges 164 of a plate 165 which is V-shaped in transverse section and which has vertical flanges 166 secured to vertical flanges 167 of a frame 168 whose horizontal flanges 169 are supported upon cross bars 170 fastened to longitudinally extending angle bars 171 which provide the frame upon which the table 104 is supported. The carriage 160 carries screws 180 upon which eccentric bushings 180a are mounted. The eccentric bushings 180a rotatably support discs 181 (see Fig. 9) which may engage the flanges 167 of the frame 168 and thus provide means for limiting the lateral movement of the carriage 160. The eccentric bushings 180a are secured upon the desired position of adjustment by tightening the screws 180.

The carriage 160 carries a plurality of record disc holders each comprising a pair of parallel spaced plates 182 and 183. The left hand end plate 182 in Fig. 10 is provided with feet 182a secured by screws 182b to the carriage 160. The right hand end plate 183 has feet 183a attached by screws 183b to the carriage 160. The intermediate plates adjacent to each other are secured in pairs to blocks 184 attached by screws 185 to the carriage 160. The plates 182 and 183 are provided with aligned holes 186 and 187 and receive between them a record disc 200 whose centering hole 201 is located approximately in alignment with holes 186 and 187 when the disc is supported by the disc holders as shown in Fig. 13. Each disc holder carries an automatically releasing disc supporting arm which will center the disc with respect to the holder and which will prevent the disc from dropping by gravity from the disc support but which will permit withdrawal of the record by an upward movement thereof. For this purpose each plate 183 is provided with ears 188 pivotally supporting a lever 189 having a finger 190 adapted to enter the record disc hole 201. The lever 189 carries a leaf spring member 191 bearing at its free end against the plate 183 thereby urging the lever finger 190 away from the record disc receiving space between the plates 182 and 183. The lever 189 carries a leaf spring member 192 which may be an extension of member 191. The member 192 is adapted to extend into the record receiving space between the plates 182 and 183. Fig. 11 shows a record 200 being placed in a record holder. As the disc 200 moves downwardly it engages the spring 192 and causes the lever 189 to move counterclockwise against the lesser tension of spring 191 into the position shown in Fig. 12 in which position the finger 190 is urged toward the disc 200. As downward movement of the disc 200 continues to bring the hole 201 into alignment with the holes 186 and 187 of the disc holder plates 182 and 183 the finger 190 moves into the hole 201 to support the disc. When it is desired to withdraw the disc 200 by upward movement thereof, the edge 202 of the hole 201 engages a beveled surface 193 of the finger 190 thus causing the lever 189 to move into the position shown in Fig. 12 to permit withdrawing a disc from its holder.

For convenience in explaining the operation of the record selecting mechanism the various record discs 200 mounted in the magazine B as shown in Fig. 10 are numbered 1 to 10 respectively reading from right to left. The right hand side of disc 1 is called 1R of disc 201 and the left hand side 1L, etc., the left hand side of disc 10 being 10L. Some of the records may be twelve inches in diameter and some ten inches. The larger records extend through slots 195 in the carriage 160.

The carriage 160 supports a frame 203 providing an oblong recess 204, the side walls of which receive the end 205 of a drive shaft 206 which provides a pinion 207 meshing with an endless rack 208 secured by screws 209 to the frame 203. The shaft 206 is permitted to move vertically but not horizontally since it is confined between parallel flanges 210 which bound an opening 211 in the V-plate 165 through which the shaft 206 extends. The rotation of the shaft 206 is clockwise as viewed in Fig. 10. When this shaft rotates the carriage 160 will be moved first toward the right as viewed in Fig. 10 until the left hand end of the rack 208 is engaged by the pinion 207. After the pinion has traveled vertically so as to mesh with the upper side of the rack 208, the carriage 160 will be shifted toward the left so as to return the carriage to the position shown in Fig. 10 and the shaft 206 to the lower position in which the pinion 207 engages again the under side of the rack.

Referring to Fig. 54 and 58 to 61 the shaft 206 carries a universal joint disc 220 provided with holes for receiving pins 221 fixed to a gear 222 carrying a stub shaft 223 journalled in a bearing provided by the frame 117. Springs 224 surround the pins 221 and bear against the gear 222 and the disc 220 in order to urge the shaft 206 toward the right as viewed in Figs. 54 and 7. In this way the end 205 of shaft 206 is retained within the recess 204 of the frame 203. The gear 222 meshes with a gear 225 fixed to a shaft 226 journalled in a bearing 227 provided by the frame 117. A collar 228 is fixed to the shaft 226 and provides a lug 229 engageable with a lug 230 provided by a lever 231 pivoted upon a screw 232 attached to a disc 233 fixed to a shaft 234 journalled in a bearing 235 provided by the frame 117. The members 231 and 228 are shown connected for connecting the shaft 234 drivingly with the shaft 226 in Fig. 60, and Fig. 61 shows these members disconnected. The manner of controlling the connection and disconnection of these members will be described later in connection with the description of the control of record selection. The shaft 234 carries a bevel gear 236 meshing with a bevel gear 237 driven by a shaft 238 having bearings 239 and 240 provided by the frame 117. The shaft 238 is drivingly connected with the hub 241 of the shell 107.

*Record transfer arm and operating mechanism*

Referring to the general views in Figs. 1, 2, 3, 4 and 5 and to the detail views in Figs. 14 to 24, the record gripping transfer arm designated C in Fig. 1 comprises an arm frame 250 carrying pivot pins 251 which pivotally support a pair of gripping fingers 252 provided with felt or rubber buttons 253 for engaging the record disc 200. The arms 252 are yieldingly urged apart at their gripping ends by springs 254 located between the opposite ends of the arms and stop bars 255 fastened to the arm frame 250. The arm 250 has a hub 256 journalled upon a tubular bearing 257 having a hub 258 extending at right angles to the tubular bearing 257 and journalled upon a shaft 259 which is journalled in bearing 260 and 261 provided by a bracket 262 secured by screws 263 to the table 104. The gripper arm hub 256 is retained upon its bearing 257 by two straight keys 264 received each by an annular groove 265 in the hub 256 and by an annular groove 267 in the bearing sleeve 257. The shaft 259 is rotatably connected with the hub 258 by a sliding bar 270 carrying bevel rack teeth 271 engaging the bevel rack teeth 272 of a longitudinally slidable bar 273 slidable within the shaft 259. The bar 273 is urged toward the left by spring 274 located within the shaft 259 and bearing at one end against the bar 273 and at the other end against a cap 275 threaded on one end of the shaft 259. The bar 270 is provided with a cylindrical extension 276 upon which is journalled a wedge member 277 having a conical upper end 278 for entering between the lower ends of the gripper arm 252 as viewed in Fig. 18. The wedge 277 is swiveled on the extension 276 of the bar 270 and is retained thereon by a pin 279 which enters an annular groove 280 in the extension 276.

The hub 256 of the gripper arm frame 250 is provided with mutilated bevel gears 281 and 282 engageable selectively with mutilated bevel gears 283 and 284 respectively. The gears 283 and 284 are respectively formed integrally with discs 285 and 286 which are slidably supported for horizontal movement by the bearing members 260 and 261 of the bracket 262 and which are tied together by integral tie bars 287 and 288 fitting with surfaces 289 and 290 respectively of the bracket 262 as shown in Fig. 17 whereby the gears 283 and 284 can not rotate but can be shifted horizontally in a direction parallel to the axis of rotation of the shaft 259. The rotation of the arm frame 250 about the axis of the sleeve 257 is prevented except when either one of the pairs of gears 281, 283 or 282, 284, are in engagement. This is accomplished by providing the gripper arm frame hub 256 with flats 291 and 292 engageable respectively with flats 293 and 294 of the discs 285 and 286 respectively. The flats 293 and 294 terminate where the gears 283 and 284 begin. For example, the flat 294 terminates at the edge 294a in Fig. 17.

It is apparent that the gripper arm 250 is rotatable with the shaft 259 about the horizontal axis thereof, and during a rest period of the gripper arm 250 the gripping fingers 252 may engage a record disc 200. During a certain period of the swinging of the arm 250 about the axis of the shaft 259, the arm 250 will be rotated about the axis of the sleeve 257 in either direction depending upon which pair of mutilated gears are engaged. The various mechanisms for actuating the gripper fingers into record engaging and disengaging position and for rotating the gripper arm about its horizontal and vertical axes as viewed in Fig. 18 will now be described.

Referring first to Figs. 54, 57 and 56 the hollow shaft 238 carries two diametrically located pins 300 received by a longitudinal notch 301 in a sleeve 302 integral with a driving clutch 303 adapted to engage a driven clutch 304 integral with a gear 305 rotatable about the shaft 238. The gear 305 drives a gear 306 fixed to a shaft 307 having bearings 308 and 309 provided by the frame 117 and extending above the table 104 and there driving a gear 310 meshing with a gear 311 which is rotatably supported by the bearing sleeve 103 and which is drivingly connected with discs 312, 313, and 314. The disc 313 supports the cam follower end portion 315 of a lever 316 pivoted on a screw 317 which is attached to an ear 318 of the bracket 262. The cam follower 315 of the lever 316 engages the cam surface 320 which is provided by the disc 314. The outline of the cam 320 is shown in Fig. 14 by broken line of relatively long dashes. The lever 316 has a bifurcated end 321 which receives a finger 322 adapted to bear against the rack rod 273 in order to actuate the same against the spring 274. The finger 322 is adjustable with respect to the lever 316 by turning a screw 323 threaded into one arm 321a of the bifurcated end of the lever 316, said screw bearing against the finger 322. Finger 322 is retained laterally by a yoke 324 and longitudinally by screw 325 attached to the lever 316. The direction of rotation of the cam 320 is clockwise as viewed in Fig. 14. When the lever follower 315 engages the dwell surface 320a to 320b, the rack bar 273 is located as shown in Fig. 18 and the grippers 252 are in non-gripping position. As the cam rotates so that its lobe 320b to 320c is engaged by the follower 315 the lever 316 will be so moved that the rack bar 273 will be moved into the position shown in Fig. 19, thereby causing the gripping fingers 252 to engage a record 200. The lobe 320c to 320d is of such width that the grippers 252 will hold the record while it is being transferred from the magazine to the turn table. While the follower 315 engages the dwell 320e to 320f the grippers will be released. While the follower 315 is engaged by the lobe 320f to 320g the grippers will engage the record again, and while the follower 315 is engaged by the lobe 320g to 320h the gripped record is being transferred from the turn table to the magazine and the dwell 320b—320a causes the grippers 252 to ungrip the record. By the time the record has been returned to the magazine the follower 315 will have moved from the position last mentioned to the dwell 320 about midway thereof as shown in Fig. 14, and during this latter movement of the cam 320, the gripper arm 250 is returned to vertical position shown in Fig. 16.

The shaft 259 is rotated in order to rotate the gripper arm 250 and fingers 262 into the various positions shown in Figs. 16 to 22 during the rotation of the cam 320. The cam disc 314 carries a stud 330 pivotally supporting a roller 331 received in a cam race 332 provided by two spaced discs 333 and 334 having respectively outer and inner surfaces 333a and 334a so shaped as to provide the desired cam contour. The plates 333 and 334 are fastened to the under side of a slide bar 335 which together with the plate 333 provides an elongated opening 336 which provides clearance for the turn table spindle 102. The sliding bar 335 is prevented from turning by providing it at one end with a notch 337 which travels along a screw 338 fixed to a supporting bracket 339 attached to the table 104. The screw 338 also secures a washer 340 which holds one end of the slide bar 335 upon the bracket 339. Near the other end, the bar 335 carries a stud 341 which is received by a slot 342 in the bracket 262. The bar 335 is attached to a rack 343 engageable with a gear 344 integral with the shaft 259. The rack 343 is supported vertically by a roller 345 secured by a screw 346 which is attached to the bracket 262. The screw 346 also retains a washer 347 which prevents lateral movement of the rack 343.

Referring to Fig. 14, the cam provided by the surfaces 333a and 334a is non-rotatable, the plate 335 being actuated through the cam by the roller 331 which rotates clockwise about the axis of the shaft 102. As the roller 331 moves clockwise through an angular distance of about 45° the plate 335 will have been shifted toward the right of Fig. 14 sufficiently to cause movement of the arm 250 and grippers 252 from the position shown in Fig. 16 to that shown in Fig. 17. While the grippers 252 remain in record receiving but not gripping position shown in Fig. 17, during further movement of the roller 331 in which it produces no motion of the slide 335 the cam 320 will have moved the lever 316 counter-clockwise as viewed in Fig. 14 sufficiently to move the grippers 252 into gripping position shown in Fig. 19. During about 90° of rotation of the cam disc 314 during which the record remains gripped between the grippers 252, the arm 250 is moved from position shown in Fig. 17 clockwise into position shown in either Fig. 21 or Fig. 20 and finally into the position shown in Fig. 22 in which position the record 200 is located upon the turn table. Then the cam 320 permits the arm 316 to be released in order to release the grippers. Shortly after the release of the record while on the turn table and immediately after the engagement of the tone arm with the record, rotation of the disc 314 is stopped automatically in order that the tone arm may track with the record and reproduce the selection recorded. Then after the playing of the record rotation of the disc 314 is automatically resumed in a manner to be described later in order to withdraw the tone arm and to cause the grippers to engage the record and the gripper arm to move from the position shown in Fig. 22 to that shown in Fig. 17 in order to transfer the record to the magazine, after which the grippers are released and then the gripper arm returns to the vertical position shown in Fig. 16 while the record remains in the magazine.

It is apparent that the stresses set up in the mechanism for rotating the gripper arm 250 about the axis of shaft 259 are far greater when lifting the record from the magazine or when lifting the record from the turn table to deliver it upon the turn table or to return it to the magazine than at any other time. Since it is a desirable feature to keep the mechanism as compact as possible the main control cam plates 333 and 334 and the cooperating roller 331 are made relatively thin. Hence, they are not as strong as might be desirable to withstand the greatest stresses but strong enough to withstand the ordinary stresses in the gripper arm rotating mechanism. In order to assist the roller 331 and cam plates 333 and 334 during the operation of lifting the record from the magazine or from the turn table, there is provided a booster mechanism comprising a slide 350 guided for horizontal movement parallel to the plate 335 by ways 351 and 352 provided by the legs 353 and 354 respectively of the bracket 262. The slide 350 has integral uprights 355 supporting a rod 356 having shoulders 357 and 358 against which collars 359 and 360 are urged respectively by springs 361 and 362 respectively. The collars 359 and 360 are each adapted to engage the stud 341. The slide 350 carries a stud 363 pivotally supporting a roller 364 received by a cam race 365 in the gear 311. In Fig. 14 this cam race is bounded by cam surfaces 365a and 365b indicated by the broken lines of short dashes in Fig. 14.

During the first 90° of clockwise rotation of the cams 364a and 364b from the position shown in Fig. 14 no motion of the slide 350 takes place, but during this time the slide 335 will have been moved from left toward right in order to move the grippers 252 into record gripping position and also the grippers will be engaged with the record as shown in Fig. 19. This movement of the slide 335 will cause the stud 341 to move near the collar 360. Then as the portion 365a to 365b of the cam race 365 receives the rollers 364 the slide 350 will be moved toward the right while the slide 335 remains stationary. Thus the spring 362 will be compressed beyond its initial state of compression and thus store energy which will later be released in order to assist the cams 333a, 334a in starting the gripper arm 250 and record supported thereby into motion from the position shown in Fig. 17. In a similar manner while the race portion 365c to 365d receives the roller 364 the slide 350 is being moved toward the right while the slide 335 remains stationary, thus compressing the spring 361 beyond its initial state of compression to store energy therein while the collar 357 remains forced against the stud 341. Then, when motion of the slide 335 toward the right is permitted by the cams 333a and 334a, the energy stored in the spring 361 will be released to assist in the lifting of the record by the gripper arm 350 from the turn table.

As the arm 250 swings from a vertical position toward the position shown in Fig. 22 it is caused to turn about the axis of the sleeve 257, or about an axis passing diametrically across the record, in either direction depending on which pair of mutilated bevel gears 281, 283 or 282, 284 are engaged at that time. Referring to Fig. 23, the engagement of these pairs of gears is determined by the position of the frame which comprises the discs 285 and 286 and the connecting tie bars 287 and 288. This frame carrying the mutilated gears is shifted automatically into either of the positions shown in Fig. 23 or Fig. 24 in response to the swinging movement of the shaft 206. When the shaft 206 is in the lowermost position shown in Fig. 7 or when the pinion 207 engages the under side of the endless rack 208 the mutilated gear frame will be located as shown in Fig. 23 thus locating the gear 284 in position to be engaged by the gear 282 carried by the gripper frame 250. When the shaft 206 is in upper position, or when the pinion 207 rides upon the upper side of the endless rack 208 the mutilated gear frame will be located as shown in Fig. 24 so that a mutilated bevel gear 283 will be located so as to be engaged by the mutilated gear 281 of the gripper frame 250. The mechanism for effecting the shifting of the mutilated gear frame in response to vertical movement of the shaft 206 comprises a collar 370 surrounding the shaft 206 and carrying studs 371 pivotally engaging arms 372 secured by screws 373 and nuts 374 to a link 375 pivotally connected by a screw 376 with a lever 377 pivoted upon a screw 378 attached to a bracket 379. The lever 377 has ears 380 and 381 threadedly engaged by screws 382 and 383 respectively which are locked in position by nuts 384 and 385 respectively. The flat heads of these screws include between them a pin 386 attached to a lever 387 pivoted upon a screw 388 attached to the bracket 262. The lever 387 is adapted to engage the flat heads of either of screws 389 threadedly received by ears 390 and 391 of the mutilated gear frame. The spring 392 is attached at one end to the stud 386 and at the other end to the cross tie member 287 of the mutilated gear frame. When the shaft 206 is in the lower position shown in Fig. 23 the mutilated gear frame is located by the mechanism in its extreme right position in which position it is retained nonyieldingly. The spring 392 operates to urge the lever 387 counterclockwise in order to engage the lever 387 with the flat head of screw 389 in the ear 391 in its extreme right hand position. When the shaft 206 moves upwardly the lever 377 is turned counterclockwise thus causing the lever 387 to move from the position shown in Fig. 23 to that shown in Fig. 24. During its movement clockwise, the lever 387 pushes against the flat head of the screw 389 in ear 390 in order to shift the mutilated gear frame into its extreme left hand position shown in Fig. 24.

It is apparent therefore that while the record magazine is traveling from its position shown in Fig. 10 toward the right that the shaft 206 will be in lower position and therefore the mutilated gear 284 will be located so as to be engaged by the mutilated gear 282 no matter what may be the location of the record magazine when it is automatically stopped by the record selecting mechanism. Therefore, when the record magazine stops during its right hand movement, the gripper arm will be conditioned for rotation about its longitudinal axis in a direction such as to place the right hand side (as viewed in Fig. 10) of any record disc upon the turn table in the manner shown in Fig. 20. Conversely when the record magazine begins traveling toward the left from an extreme right hand position toward the position shown in Fig. 10, the shaft 206 will be in upper position, thus conditioning the mutilated gear 283 for driving connection with the gear 281 of the gripper frame 250. Therefore, if the record magazine is automatically stopped during its travel toward the left the record gripped by the fingers 252 will be turned in the manner shown in Fig. 21 so that the left hand side (as viewed in Fig. 10) of the record will be uppermost upon the turn table.

If, for example, the magazine is capable of holding ten record discs as shown in Fig. 10, in order to play either side of the ten records selectively, it is necessary to control the record carriage so that it can stop in any one of ten positions while moving toward the right from the position shown in Fig. 10 or in any one of ten similar positions while moving toward the left from an extreme right position toward the position shown in Fig. 10. Although there are in fact ten different positions of the record carriage there are really twenty different conditions under which the record magazine can be stopped, that is, there can be ten positions while the pinion 207 is engaging the under side of the endless rack 208 and ten positions while the pinion is engaging the upper side of the rack 208. Thus by providing these twenty different conditions or positions of the magazine carriage 160 and rack 208 relative to the pinion 207 and shaft 206 it is possible selectively to control the machine so that the playing of any side of any of the ten records can be obtained whenever desired. The automatic control of the stopping of the magazine 160 in any one of twenty different positions of the rack 208 relative to the pinion 207 is effected by a mechanism which will be described under the heading of "automatic control of the machine".

*Tone arm and operating mechanism*

The tone arm designated D in Fig. 1 and its operating mechanism will now be described with particular reference to Figs. 25 to 35. The tone arm D comprises a lever 400 formed of pressed metal inverted U-shaped in cross section and supporting a reproducer 401 carrying a needle 402 and containing a device known to the trade as an "electrical pick-up" which is connected by wires 403 and 404 in Fig. 26 to an amplifier and speaker of the radio type. A screw 405 attaches the arm 400 to a post 406 journalled upon a trunnion screw 407 supported by a forked bracket 408, the base of which carries a stub shaft 409 which extends through a bearing 410 secured to the table 104 and receives nuts 411 which retain the shaft 409 in position as shown in Fig. 26 while providing for pivotal movement of the bracket 408. The nuts 411 retain a friction washer 411a which bears against the lower end of the bearing bracket 410 and yieldingly resists the swinging of the tone arm for a purpose to be described. The lower end of the post 406 is secured to a plate 412 carrying counterweights 413 and 414 which are only sufficiently heavy to counterbalance part of the weight of the tone arm portion extending toward the left from the post 406, there being sufficient unbalanced weight to provide for gravitating the needle against the record track with sufficient pressure to insure proper operation of the reproducer. The tone arm is held in position retracted from the record and above the record by an operating lever 415 having a notch 416 for receiving the head of a screw 417 threaded through the plate 412 and having a conical shoulder 418 supported by the lever 415. The screw 416 is locked in adjusted position by lock nut 419. The lever 415 is pivoted upon a screw 420 attached to an operating lever 421 to which a trunnion block is secured by screw 423. The block 422 is pivoted upon point bearings on the ends of screws 423a threaded through a forked bracket 424 attached to the plate 104, the screws 423a being secured in adjusted position by lock nuts 425. The lever 421 has a forked end 426 pivotally supporting a roller 427. Adjacent this forked end the lever fork 421 supports a stud 428 carrying a roller 429. The plate 313 is provided with a notch 430 for receiving the roller 427 when it is desired to lower the reproducer needle upon the record and to cause the record to be played. The roller 427 is guided into the notch 430 by rolling upwardly along the beveled camming surface 431 and is guided out of the notch 430 by rolling downwardly along the beveled camming surface 432. When the roller rests upon the under surface of the plate 313 the plate 415 shown in Fig. 27 is located in position for tilting the tone arm post 406 toward the right as shown in Fig. 26 to elevate the needle from the record. When the roller 427 is received by the notch 430 so that the roller rests upon the under surface of the disc 314 the lever 415 will be located in position for permitting the reproducer needle to rest upon the record which position is shown in Fig. 34.

The disc 312 provides a cam race 440 bounded by cam surfaces 441 and 442 which cooperate with the roller 429 for the purpose of swinging the lever 421 about the axis of the screw 423 and therefore for the purpose of swinging the tone arm 400 about the axis of the stub shaft 409. Motion is not transmitted directly from the lever 421 to the actuated screw 417 carried by the tone arm post plate 412 but indirectly through the intermediate lever 415, the position of which relative to the lever 421 will be changed automatically in response to whether a ten-inch or twelve-inch record is placed upon the turn table. In order to accomplish this the lever 415 is movable between screws 444 and 445 threaded through ears 446 and 447 respectively provided by the lever 421 and locked in the desired position of adjustment by lock nuts 448 and 449 respectively. A relatively weak spring 450 attached to the ear 446 and the lever 415 urges the lever 415 toward the screw 444 and thereby causes an arcuate surface 451 of the lever 415 to bear against either the cylindrical surface 452 of larger diameter or the cylindrical surface 453 of smaller diameter provided by a stop plunger 454 guided by a stop plunger cylinder 455 attached to the lever 421 as shown in Fig. 29. A spring 456 urges the plunger 454 upwardly so that its shoulder 457 will engage the under side of the lever 415. The plunger 454 carries a stem 458 the head 459 of which is not engaged by a ten-inch record 200 shown in Fig. 29 when placed upon the turn table. When a twelve-inch record 200 is placed upon the turn table its peripheral portion will engage the plunger head 459 and move the plunger from the position shown in Fig. 29 to the position shown in Fig. 30 thereby retracting the stop cylindrical surface 452 of larger diameter from the arcuate surface 451 of lever 415 and presenting the stop surface 453 of smaller diameter. The spring 450 will be permitted to urge the lever 415 clockwise about its pivot screw 420 while the lever 421 remains stationary. Therefore there will be a tendency to move the tone arm 400 counterclockwise about the axis of stub shaft 409 as viewed in Fig. 25, this tendency to move counterclockwise being resisted by the friction at the bearing supporting the tone arm, which friction resists rotation of the tone arm in either direction about the axis of the stub shaft 409, thus retaining the lever 415 yieldingly in the position as shown in full lines in Fig. 28.

Assuming first that a ten-inch record has been placed upon the turn table, referring to Fig. 28, it will be seen that the cam surface 442a has cooperated with the roller 429 in order to swing the lever 421 counterclockwise about its pivot screw 423 and the tone arm 400 clockwise into playing position shown in full lines in Fig. 28. As the tone arm approaches playing position the beveled camming surface 431 passes clockwise over the roller 427 permitting the latter to move in the notch 430 so that the left hand end of the lever 421 may move upwardly and the right hand end nearest the tone arm pivot to move downwardly such a distance that the forked end 416 of lever 415 entirely clears the beveled surface 418 of the actuated screw 417 after the reproducer needle 402 is engaged by the record as shown in Fig. 34. When a ten-inch record is upon the turn table the initial position of the tone arm 400 is as shown in Fig. 25 and the position to which the tone arm is brought due to the cooperation of the cam 422a with the roller 429 is as shown in full lines in Fig. 28. However, if a twelve-inch record has been placed upon the turn table, the tone arm will be moved during the cooperation of the cam with cam 422a with the roller 429 from the initial position shown in full lines in Fig. 25 only as far as the position 400b shown in dot-and-dash lines in Fig. 28 which is the proper position for starting to play a twelve inch record. This decrease in the swing of the tone arm from initial to the start playing position is due to the fact that, since the plunger 454 has been pushed downwardly into the position shown in Fig. 30, and the lever 415 is yieldingly retained in the position shown in full lines in Fig. 28 for reasons already mentioned, there is lost motion to be taken up between the levers 421 and 415 amounting to the difference in the radii of surfaces 452 and 453, the lever 415 dragging behind the motion of the lever 421 counterclockwise due to the fact that the friction washer 411a presents a slight frictional resistance to corresponding movement of the tone arm 400 clockwise in the playing position.

During the playing of a record, rotation of the gear 311 and all the cams driven thereby is temporarily arrested during which time the lever 421 swings counterclockwise as the tone arm swings clockwise towards the center of the record. To provide for this movement of the lever 421 the cam race 440 is provided with the wide portion 440a in Fig. 28 to permit the roller 429 to swing from the position shown in Fig. 28 to the position shown in Fig. 32. Following the playing of the record, rotation of the gear 311 is automatically resumed so as to cause the beveled camming surface 432 to ride upon the roller 427 thereby causing the left hand end of the lever 421 to move downwardly and the right hand end to move upwardly in order to tilt the post 406 toward the right as shown in Fig. 26 and to elevate the needle 402. Following this the cam surface 441a engages the roller 429 in order to move the lever 421 clockwise and the tone arm 400 counterclockwise to return it to a position shown in Fig. 25. During the latter part of the movement of the tone arm into normal position the grippers 252 have engaged the record and begin to lift it from the turn table even before the return of the tone arm to normal position has been completed. In case a twelve-inch record has been played, the lifting of that record just before the end of the return swing of the tone arm will permit the spring 456 to move the plunger 454 upwardly. Since the return movement of the tone arm 400 is frictionally resisted by the friction of the tone arm bearing, the lever 421 will nonyieldingly move ahead in a clockwise direction of rotation of the lever 415 which drags behind, until engaged by the screw 445 threaded in the ear 447 of the lever 421, thereby stretching the spring 450 and increasing the distance between the lever 415 and the stop screw 444 sufficiently to cause the lever 415 to clear the shoulder 452a between the surfaces 452 and 453 of the plunger 454 and thus permitting the spring pressed plunger 454 to follow the raising record until it reaches its upper position shown in Fig. 29.

As stated before, during the playing of the record rotation of the cam discs 312, 313, and 314 is temporarily arrested and automatically resumed after the playing of the record. This is accomplished by mechanism which will now be described.

After the movement of the record carriage into a predetermined position for the presentation of a certain record disc adjacent the record gripper, the clutch members 303 and 304 shown in Figs. 57 and 37 are permitted to become engaged by means to be described later. The engagement of these clutch members as shown in Fig. 37 takes place through the operation of a spring 460 connected at one end with frame 117 at the other end with a link 461 having arms 462 received by a groove 463 in the clutch collar 302. The link is provided with a slot 464 receiving a screw 465 and providing therewith a lost motion connection with the lever 466 fixed to a shaft 467 carrying a lever 468 connected with a rod 469 having a turn-buckle connection 470 with a slide 471 which moves vertically through a block 472 attached by screws 473 to the table 104. The block 472 provides a guide for the vertical movement of a block 474 carrying a pin 475 extending across a notch 476 in said block and connected with a lever arm 477 of a bell crank lever which is pivoted upon a pin 478 and which provides a lever arm 479 adapted to bear against the periphery of the disc 312. The arm 479 is urged against said disc 312 by a spring 480 bearing against its lower end against a washer 480a and at the head of a screw 481 threaded into the block 474. The block 474 has a hole 482 adapted to be moved into alignment with slots 483 and 484 provided by the block 472 for receiving a rod 485 which passes through a hole 486 in the bar 471.

The rod 485 is hooked around a pin 490 shown in Fig. 25 which is attached to a lever 491 pivoted upon a screw 492 threaded into a bracket 493 attached to the table 104. The pin 490 projects into a notch provided by an arm 494 of a lever 495 pivoted upon a screw 496 threaded into the block 493. A spring 497 which connects the levers 495 and 491 urges the rod 485 toward the left as viewed in Figs. 25 and 37 thus urges the rod 485 against the right hand side of the block 474 as viewed in Fig. 37. During the rotation of the disc 312 while the record is being transferred from the magazine to the turn table and the tone arm is being moved horizontally and then lowered vertically into playing position, the lever arm 479 engages the cylindrical periphery of the disc 312. However, at the end of the amount of movement of the disc 312 required for bringing the tone arm into playing position, a lug 312a provided by the disc 312 engages the lever 479 and moves it into the position shown in Figs. 28 and 40 thus causing the block 474 to move downwardly from the position shown in Figs. 37 and 38 into the position shown in Figs. 39 and 40. In this position of the block 474 the hole 482 is brought into alignment with the end of the rod 485 permitting the same to move into the hole 482 and thus to tie together the block 474 and the slide bar 471. Then when the lug 312a of the disc 312 clears the end of the lever 479 the said lever will be permitted to move from the position shown in Fig. 28 to the position shown in Fig. 32, whereupon the spring 480 will be permitted to expand and to move the lever 479 from the position shown in Fig. 40 to that shown in Fig. 38, and the block 474 and the slide 471 from the positions shown in Fig. 39 to those shown in Fig. 41. Since the spring 480 is stronger than the spring 460 the clutch 303 will be separated from the clutch 404 and the gear 305 will be disconnected from the rotating shaft 238 whereupon rotation of the gear 311 and all of the cams carried thereby will automatically cease.

In order to provide for automatically resuming rotation of the gear 311 after the playing of the record, there has been provided a mechanism which is operated for the purpose of accomplishing this in response to an oscillatory movement of short amplitude of the tone arm which takes place after the needle leaves the record groove tracks and tracks with the eccentric groove at the center of the record. A portion of this eccentric groove is shown at 499 in Fig. 32. In order to take advantage of this oscillatory movement of the tone arm the lever 491 is provided with a vertical flange 500 provided with teeth 501 adapted to be engaged by a blade 502 provided by the vertical flange 503 of a lever 504 attached by a screw 505 to a bracket 506 attached to the plate 412 as shown in Fig. 36. The lever 504 is permitted to move vertically a slight distance due to the fact that the screw 505 provides a loose joint between the lever 504 and the bracket 506 as best shown in Fig. 26. The lever 504 can not move pivotally about the screw 505 since it is confined between a flange 507 extending upwardly from the bracket 506 and a flange 508 which extends downwardly therefrom and bears against the left hand side of the flange 503 of the lever 504. The bracket 506 is provided with a flange 509 adapted to be engaged by a screw 510 threaded through an ear 511 provided by the lever 495. During the playing of the record the knife edge 502 engages the teeth 501 carried by the lever 491 and rides along these teeth which have their inclined sides inclined upwardly and toward the center of the turn table or toward the left as viewed in Fig. 34. After the needle reaches the eccentric groove and receives a motion tending to swing the tone arm away from the turn table center, the teeth 501 are engaged by the knife edge 502; and thus the lever 491 is caused to swing clockwise about the pivot screw 492 and the rod 485 is caused to move toward the right as viewed in Figs. 25, 28 and 32 and 41 from the position shown in Fig. 41 so as to be free of the block 474.

It has been found that certain records will have eccentric grooves of lesser diameter than others and thus when the needle of the tone arm rides in such smaller diameter grooves, the tone arm will be in a position in which the bracket 506 carrying knife blade 502 will maintain said knife blade out of engagement with the teeth 501 of the lever 491, since the knife blade 502 cleared the last engageable tooth 501 of the levers 491 while the record was being reproduced, consequently oscillations of the arm and also the knife blade 502 will not result in rotation of bracket 491 in a clockwise direction. In order to obtain movement of the rod 485 toward the right, when the tone arm needle is riding in such a small diameter eccentric groove, flange 509 of the bracket 506 is adapted to engage the screw 510 adjustably carried on an angular ear 511 of the bracket 495. As the tone arm needle is riding in the smaller diameter eccentric groove and is oscillating the bracket 506, this shoulder 509 may engage the screw 510, resulting in a counter-clockwise movement of the lever 495, thereby obtaining a movement of the rod 485 toward the right. This result is exactly as though the knife blade 502 were engaging with the teeth 501 of the lever 491.

As soon as the rod 485 clears the block 474, the spring 460 is released to move the clutch member 303 into engagement with the clutch member 304 while the rod 469 and the slide 471 move downwardly from the position shown in Fig. 41 to the position shown in Fig. 37. The clutch members 303 and 304 having been reengaged, rotation of the gear 311 and the cams carried thereby will be resumed in order to operate the mechanisms which respectively lift the needle from the record, return the tone arm to normal position then transfer the record from the turn table to the magazine and finally return the gripper arms in normal position. Following these operations the machine will be automatically stopped by mechanisms to be described unless meanwhile other records have been selected in which event the machine does not stop until all the selected records have been played.

The bracket 506 carrying the knife blade lever 504 is adjustably supported on the tone arm post plate 412 by two screws 506a. A fulcrum point 402a provided on the plate 412 is located between the two screws 506a. A stop screw 412b is also carried by plate 412 this stop screw being engaged by the bracket 506. In order to adjust the knife member 502 so that it is in proper position relative to the teeth 501 of the lever 491 screws 506a may be operated to tilt the bracket 506 about the fulcrum 412a in any direction. When the bracket 506 has been adjusted properly so that its knife member 502 is in proper relative position to the teeth 501, then stop screw 412b is operated to engage the bracket 506 in this adjusted position thereby holding said bracket in said adjusted position.

Automatic control of the machine

Referring to Figs. 42 to 47 the table 104 supports controller cylinder frame comprising side plates 520 and 521 which are tied together by tie bars 522 and 523, 524, and 524a and which provide bearings for a shaft 525 driven by gear 526 meshing with a gear 527 driven by a shaft 528 which as shown in Fig. 48 is journalled in bearings 529 and 530 respectively carried by the plate 521 and the frame 117. The shaft 528 is driven by a gear 531 meshing with gear 222. It is therefore apparent that shaft 525 is driven concurrently with the shaft 206 which operates the magazine carriage. The gearing connecting the shaft 525 with the gear 222 is of such a ratio that during one complete oscillation or cycle of movement of the record carriage the shaft 525 will make one complete revolution. Since in the illustrated machine the magazine holds ten record discs from which twenty record selections may be played, the shaft 525 drives a drum 535 carrying twenty stop screws 536 the heads of which project radially with respect to the shaft 525 and which are arranged equiangularly distant in a spiral row of one turn in length. Each of the screw heads cooperates with a mechanism for causing the record magazine to stop when a predetermined record has reached the position to be transferred by the gripper arms. Since each screw head or stop 536 has a duty to perform with respect to one of the twenty records which this machine is capable of playing, the stop screws are numbered, reading right toward left in Fig. 42, 1R to 10R and 10L to 1L. In other words, the stop screws 1R to 10R respectively operate in connection with the selecting of one of the records on the right hand side (as viewed in Fig. 10) of any of the ten records, and stop screws 10L to 1L operate respectively in connection with the selection of any record on the left hand side of any record disc.

Each stop screw 536 is adapted to cooperate with one of twenty stop levers 537 guided for vertical movement by a cross bar 538 having openings 539 therein through which the levers 537 project. The levers 537 are respectively pivotally connected with levers 540 fixed to a shaft 541 carried by the side plates 520 and 521. The levers 540 are yieldingly urged upwardly by springs 542 respectively each connected with a lever 540 and a rod 543 extending between the side plates 520 and 521. The levers 540 cooperate with a rod 544 extending horizontally below all of these levers and provided with radial arms 545 which terminate in shaft journal portions 546 and 547 having bearings in the side plates 520 and 521 respectively. The shaft portion 547 extends into a crank portion 548 carrying a crank pin 549. Each lever 537 is pivotally connected by a link 550 with a lever 551 pivoted upon a rod 552 supported by the cross bar 525 which has a row of notches 553 each for receiving a lever 551. Each lever 551 is urged by a spring 554 in a counterclockwise direction against a latch lever 555 pivoted on a rod 556 whose ends are fixed to the side plates 520 and 521. Each latch lever 55 provides an armature 557 cooperating with an electro-magnet having a magnet spool 558 fixed to a frame 559 fastened to the cross bar 524. Each magnet when energized is capable of attracting an armature 557 against the action of a spring pressed plunger 560. The springs 554 urge the levers 551 against the shoulders of the latch levers 555 and also toward a rod 561 having arms 562 extending radially from journalled portions 563 and 564 supported by bearings provided by the side plates 520 and 521. The journalled portion 564 shown in Fig. 48 is secured to a clamping hub 565 of a lever 567 provided with a camming surface 566. Since it is essential that the rod 561 is always in engagement with the levers 551 and since the lever 567 in normal position tends to move the rod 561 away from the levers 551, it is necessary to provide for a bigger counter moment of rotation which assists the rod 561 in engaging the levers 551 and overcomes the smaller counterclockwise moment of rotation in the journalled portion 546 of the rod 561 caused by the lever 567 as shown in Fig. 48. To accomplish this the other journalled end 563 of the rod 561 carries a lever 563a which gives the desired result if located in a position as shown in Fig. 53.

The cam 566 of the lever 567 is engageable with the lower branch 570 of the bifurcated end of a lever 571 whose upper branch 572 provides a stop shoulder 573 for cooperation with a latch plate 574 provided by the extension 575 of a frame 576 which is pivotally supported by screw 577 fastened to the side plate 521. The frame 576 supports a mercury switch 580 comprising a glass vessel 580a carrying electrodes 581 and 582 which are electrically connected by a quantity of mercury 583 which, when the vessel 580a is in the horizontal position shown in Fig. 49, will bridge the electrodes 581 and 582. The latch stop shoulder 573 and the latch plate 574 cooperate to hold the mercury switch in tilted position shown in Fig. 48 against the action of a spring 585 connecting the frame 576 with the plate 521. The stop plate 574 connects the extension 575 with an offset portion 575a. Lateral movement of the lever 571 is prevented by locating its one branch 572 between the parts 575 and 575a and its other branch 570 between the side wall 521 and an offset portion 576a of the frame 576 as shown in Figs. 49 and 52.

Lever 571 is connected by pin 590 with a bell crank lever 591 which is loosely pivoted upon one end of shaft 467 and which has an arm connected by a pin 592 with a block 593 supporting a rod 594 which extends upwardly and through a guide bearing 595 and the table 104 as shown in Fig. 55. The upper end of the rod 594 is located just below the gear 311. The gear 311 carries a cam block 596 adapted to cooperate with the rod 594 for the purpose of moving the same downwardly and the lever 591 in a counterclockwise direction against the action of a spring 597.

The pin 590 is pivotally connected with a link 600 carrying a downwardly projecting arm 601 secured by a spring 602 to a downwardly projecting arm 603 of the link 571. The link 600 is provided with an opening 604 having notches 605 and 606 for receiving a stop pin 607 attached to a bar 608 supported and guided for horizontal movement by brackets 609 and 610 carried by the frame 117. The bar 608 is provided with a notch 611 defined in part by a beveled camming surface 612 which cooperates with a pin 613 carried by the clutch shifting link 461.

The bar 608 is connected by screw 615 with a lever 616 pivoted upon a pin 617 fixed to a bracket 618 extending from the frame 117. A spring 619 connecting the lever 616 with a plate 620 integral with the frame 117 urges the lever 616 toward the right, the bar 608 toward the right and the stop pin 607 against a shoulder 621 which in part bounds the opening 604 in the link 600. The link 600 is actuated upwardly by the lever 625 pivoted upon a screw 626 attached to the plate 620 and carrying a roller 627 adapted to bear against the right hand end of the link 600. Lever 625 carries an ear 628 through which extends a rod 629 to which a screw 630 attaches a collar 631. The left hand end of the rod 629 has a hook 632 through which the crank pin 549 passes.

The lever 616 carries a pivot screw 640 which, as shown in Fig. 58, pivotally supports a plate 641 which, as shown in Fig. 59, carries a stop screw 642 the threaded shank of which extends through a slot 643 in the lever 616 and receives a nut 644. A spring 645 has an intermediate portion coiled around the screw 640 and one end 646 extending into a hole 647 provided by the lever 616. The other end 648 of spring 645 bears against the screw 642 and tends to urge the same toward the left. The nut 644 prevents the spring end 648 from slipping off the screw 642. The head 650 of the screw 642 is engageable with a lever arm 231a of lever 231 shown in Fig. 60 when the stop screw head 650 is in the position shown in Fig. 59. When the stop screw head 650 is in the position shown in Fig. 58 it is located in the plane of part 231b of lever 231 as shown in Fig. 61. In case the screw 642 with its head 650 is automatically being shifted from its right hand toward its left hand position and is retained from further movement toward the left by the side wall of the cam portion 231b the lever 616 will nevertheless finish its clockwise movement and will be locked in a left end position regardless of the position of the screw head 650. The screw 642 which in this case is behind the lever 616 and closest to the right end of the large hole 643 is pulled in its left hand position by the spring pressed plate 641.

Referring to Figs. 48 and 54, lever 567 extending from shaft 564 is located so as to cooperate with a horizontally slidable and tiltable armature bar 660 having its left hand end guided for horizontal and pivotal movement by screws 661 and 662 attached to the side plate 521. Near its right hand end the bar 660 is confined by a U-shaped clip 662 supported by a plate 663 fastened to the frame 117 and supporting an electro-magnet winding 664 surrounding a core thus providing an electro-magnet operable to lift the bar 660 toward an eccentric disc 665 driven by the shaft 238. When the portion 665a of shorted radii of the eccentric disc 665 is located adjacent the right hand end of the bar 660, said bar is attracted by the magnet into the plane of the disc 665 so that said disc may operate upon the bar 660 to move the same toward the left against the action of a spring 666 connecting the bar 660 with the plate 521. Motion of the bar 660 toward the right by the spring 666 is limited by a pin 667 attached to the bar 660, said pin striking the screw 661.

Referring to Fig. 47, 670 and 671 are wires of a 110 volt circuit connectable by switch 672 with the primary winding 673 of a step-down transformer whose secondary winding 674 supplies current at relatively low voltage, 20 volts for example, for energizing the electro-magnets of the machine. In Fig. 47 two of the electro-magnet windings 558 are shown grounded upon a ground wire 675 and connectable by remote control switches 676 with a wire 677 leading from the non-grounded side of the secondary 674.

*Mode of operation*

Suppose, for example, it is desired to play the right hand side of record No. 7. After having closed switch 672 in order to supply current for operating the electro-magnet 558, the operator will press the proper button 676 on the control board for connecting with transformer 674 electro-magnet 558 No. 7R as designated in Fig. 42. This electro-magnet will then attract its armature 557 from the position shown in Fig. 43 into the position shown in Fig. 44, thus retracting the latch lever 555 from the lever 551 permitting the same to move into the position shown in Fig. 44 due to the action of the spring 554. Due to the connection by link 550 with the lever 537 this lever will be moved toward the drum 535 in the position for cooperation with stop screw 536 No. 7R.

The release of any one of the levers 551 causes the rod 561 to move from the position shown in Fig. 43 to that shown in Fig. 44 thereby causing the rod journal 564 and lever 567 to move from the position shown in Fig. 48 to that shown in Fig. 49. When this occurs the cam 566 will elevate the latch stop 573 of lever 571 above the latch plate 574 of switch bracket 576 thus permitting spring 585 to move the mercury switch 580 into horizontal position. When switch 580 is in horizontal position it will connect the motor 120 shown diagrammatically in Fig. 47 with the 110 volt line wires 670 and 671. The motor then operates the machine through the belt drive 119 and pulley 118 whereupon the turn table spindle 102 and turn table 100 start rotating.

As the shafts 234 and 226 shown in Fig. 54 are normally connected the shaft 206 will be rotated through the train of gearing which comprises shaft 115, gears 114, 113 included in the train of mechanism connected with the turn table spindle 102, gear 237 connected with gear 113 through the shaft 238, gear 236 meshing with gear 237, shaft 234, disc 233, screw 232, lever 231, stop lug 230 on lever 231, lug 229 on collar 228, shaft 226, gear 225, gear 222, pins 224, disc 220, and shaft 206. Referring to Fig. 10, shaft 206 turns the pinion 207 in a clockwise direction and thus causes the endless rack 208 to move from the position shown in Fig. 10 first toward the right. By the time that the magazine carriage 160 has moved toward the right until record disc No. 7 stands vertically above the vertical center line of pinion 207 and therefore in the plane of the space between the gripper fingers 252, the stop screw 536 No. 7R will have engaged lever 537 No. 7R and will have moved it from the position shown in Fig. 44 into the position shown in Fig. 45 thus moving said lever 537 at its cammed surface past the left hand end of the slot 539 in the cross-bar 538, into the position which will permit the stop pin 536 to clear the end of the lever. During the movement of this lever 537 into the position shown in Fig. 45 the downward movement of the rod 544 from the position shown in Fig. 44 to that shown in Fig. 45 is effected and hence a corresponding movement of crank 548 and crank pin 549 toward the left from the position shown in Fig. 48. This results in movement of the rod 629 toward the left from the position shown in Fig. 49 to that shown in Fig. 50 and the clockwise rotation of lever 625 which produces upward movement of link 600 about the pivot pin 590. When this occurs the stop 621 defining the right hand side of the notch 605 is clear of the pin 607 thus permitting the spring 619 to move the lever 616 from the position shown in Fig. 49 to that shown in Fig. 50. When this occurs the stop screw head 650 carried by the lever 616 will have been moved out of the plane of the part 231b shown in Fig. 61 into the plane of the part 231a shown in Fig. 60. The stop screw head 650 cooperates with the part 231a to move it from the position shown in Fig. 60 to that shown in Fig. 61, thus disconnecting the clutch members provided by the lugs 229 and 230 whereupon the drive shaft 234 will be disconnected from the carriage operating shaft 206 and the carriage will stop at the position mentioned before presenting record disc No. 7 adjacent the grippers 252. Since during the rotation of the shaft 525 in a clockwise direction as viewed in Figs. 43 to 45 in order to bring stop screw 536 No. 7R into cooperative relation with lever 537 No. 7R, the magazine carriage 160 travels toward the right from the position shown in Fig. 10 and the pinion 207 rolls along the under side of the endless rack 208, the mutilated rack carriage will be conditioned for causing the mutilated gear 284 to drive multilated gear 282 as the gripper arm rotates about its horizontal axis and carries the record from the magazine to the turn table. As previously explained under these conditions, the right hand side of the record will be uppermost when the record is placed upon the turn table.

However, before the record transfer mechanism can start operations, it is necessary to connect the clutch members 303 and 304 which connect the operating shaft 238 with the gearing for actuating the cams which control the operation of the record transfer mechanism and the tone arm. This automatic connection of clutch members 303 and 304 takes place as the result of movement of the lever 616 from the position shown in Fig. 49 to that shown in Fig. 50. When this occurs, the bar 608 moves from the position shown in Fig. 49 to that shown in Fig. 50 thus moving the deeper part of its notch 611 vertically below the pin 613 carried by the clutch operating link 461. When this occurs, the spring 460 is permitted to move the link 461 downwardly and the clutch 303 into engagement with the clutch 304. When this occurs the mechanism driven by gear 311 for driving the cams for controlling the operation of the record gripper transfer arm and the tone arm will commence operating and will complete the cycle of movements which has been described in detail under the headings of "Record gripper arm and operating mechanism" and "Tone arm and operating mechanism". Briefly, the cycle of operations includes transferring the record from the magazine to the turn table and placing the same upon the turn table with a predetermined side up according to the selection made through the agency of the electro-magnetic controls illustrated in Figs. 42 to 47. This is followed by the movement of the tone arm into playing position and lowering the same upon the record. The mechanism operated by gear 311 automatically stops after one-half cycle to permit the playing of the record. Following the playing of the record the operation of the mechanism is automatically resumed in order that the tone arm will be automatically lifted and then returned to position to clear the record and that the record will be automatically lifted from the turn table and restored to its former position upon the record magazine.

After completing the cycle of operations of the mechanism driven by gear 311 for controlling the tone arm and record gripper arm, these mechanisms are automatically stopped at the end of one revolution of gear 311 due to the cooperation of the cam block 596 carried by the gear 311 with the rod 594. As viewed in Fig. 55, the cam block 596 moves toward the right from the dot-dash line position 596a, and in doing so causes the rod 594 to move downwardly from its position shown in Fig. 50 thereby causing links 571 and 600 to move toward the right sufficiently to cause the stop latch 573 to be drawn to the right to the stop plate 564 of the mercury switch bracket 576, and sufficiently to cause the stop shoulder 621 of the link 600 to move to the right of the pin 607. When this occurs, the link 571 can move downwardly so that its stop latch 573 will be located at the right of and in the plane of the latch lug 574. At the same time the link 600 can move downwardly so that its stop shoulder 621 will be located at the right of and in the plane of the pin 607. This movement of the link 600 can occur because the lever 625 will at that time occupy the dot-dash line position 625a shown in Fig. 50 provided however that the record selecting control has not previously been operated to select another record. Assuming therefore that no other record selection has been made during the present cycle of operation of the machine these movements of links 571 and 600 will take place. Therefore as soon as the cam block 596 of gear 311 has moved into the full line position shown in Fig. 55, the rod 594 can move upwardly under the action of spring 597 controlling bell crank lever 591 shown in Fig. 48. During the upward movement of the rod 594 this bell crank lever will move the link 600 and 571 into normal position shown in Fig. 48 thereby causing the mercury switch to be tilted into circuit breaking position thereby causing the lever 616 to move into normal position in which position it locates the screw 642 carrying the head 650 in the position shown in Fig. 58 for connecting again the clutch member provided by the lugs 229 and 230. The machine is in condition for performing another complete cycle of operations. Another cycle is not initiated since the mercury switch will not be open provided however the operator has not pressed another selecting button 676 prior to the completion of a complete cycle of operation of the machine.

In case the operator desires to hear another record played he may press several record selecting buttons 676 at the same time. If he does so the machine does not stop operating after completing one cycle of operations for the purpose of playing one record but will continue to repeat its cycle of operation until all of the selected records have been played. The manner of effecting the automatic control for the purpose of playing other records before the machine stops will now be described. Referring first to Figs. 43 to 45 it will be observed that stop pin 536 No. 7R and stop lever 537 No. 7R cooperate not only for the purpose of stopping the record magazine so that record No. 9 will be presented to the gripper mechanism but that stop pin 536 and stop lever 537 cooperate also for the purpose of restoring their cooperating armature 557 to latching position. When the stop pin 536 moves the lever 537 downwardly it produces a clockwise rotation of the lever 551 from the position shown in Fig. 44 to that shown in Fig. 45 so as to permit the armature lever 557 to move clockwise and to locate the latch 555 under the left hand end of lever 551. When this occurs, the rod 561 can move upwardly from the position shown in Fig. 44 to that shown in Fig. 45 provided however, no other record selecting button has been pressed before this happens. If other record selecting buttons have been pressed before this, the rod 561 can not move upwardly, hence the lever 567 must remain in position shown in Figs. 49 and 50 in full lines. It should be observed also that the selecting of another record need not take place at the time of playing a record but another selection can be made at any time before the time of the end of the complete cycle of the machine, in other words before the cam lug 596 begins to operate on the rod 594. The pushing of any record selecting button 676 will of course release another stop lever 537 and thus cause the rod 551 to be pushed downwardly thus locating the lever 567 in the position shown in full lines in Figs. 49 and 50. Therefore, if the lever 567 is located as shown in full lines shown in Fig. 50 at the time the rod 594 is pushed downwardly by the cam block 596 the movements to the right of the links 571 and 660 may take place for the purpose of closing the clutch of the magazine shifting mechanism and for the purpose of tilting the mercury switch to open position, but only the closing of the magazine mechanism clutch will take place. The mercury switch will not be tilted from the position shown in Fig. 50 because camming surface 566 of the lever 567 holds the latch stop 573 of the link 571 above the latch plate 574 of the mercury switch bracket 576 so that the movement to the right and then to the left of the link 571 responding to down and up movement of the rod 594 will have no effect upon mercury switch. Consequently, the machine will continue to run and will move the record magazine into position corresponding to the next record in order selected and the cycle of operation of the machines for the purpose of transferring the record and controlling the tone arm will be completed. These operations will be repeated as long as any armature latches remain in attracted position toward their respective armature cores. If a plurality of records are selected the order in which they are played will be of course controlled by the operating mechanism since the magazine operating shaft 206 rotates in one direction only. For example, if during the playing of record on the right hand side of disc No. 7 the operator presses button 3R and then 7L, the machine will play record 7L before playing 3R since the playing must follow the sequence of the numbering of the stop pins shown in Fig. 42, the numbering being from right toward left that is from 1R to 10R and 10L to 1L.

In case the operator desires to cancel the selection of records other than the record being played so that the machine will stop operating after having played the record which it had started to play, the operator will press a button No. 700 in Fig. 47 thereby effecting the energization of an electro-magnet 664 which is shown also in Figs. 48 to 50. The magnet 664 attracts the armature 660 against the eccentric disc 665 which is then rotating. As the portion 665a of least radius passes adjacent the right hand end of the armature bar 660 said bar is permitted to be moved further by the magnet 664 into the plane of the disc 665. Then the disc 665 operates to move the bar 660 toward the left against the action of the spring 666 in order to move the lever 567 into the dot-dash line position 567a shown in Fig. 50. When this occurs the rod 561 will be lifted from the position shown in Fig. 44 to that shown in Fig. 43 thereby restoring all levers 551 and the latching armature 557 to normal position and thereby permitting the link 571 to return to the position shown in Fig. 48 so that the down and up movement of the rod 594, as effected by the camming block 596, will cause the link 571 to move the mercury switch into tilted position through the agency of the latch stop 573 and latch plate 574.

The complete cancel control operated by the switch button 700 will not prevent the machine from finishing the playing of a record which it already started to play but will cancel the selection of another record. If the operator desires to stop the playing of any record which the machine has started to play he will press a button 701 to effect the energization of an electro-magnet 702 located upon the machine table 104 and underneath the turn table 100. This magnet operates as its armature the lever 491. Upon the attraction of this armature lever 491 toward the magnet 702 the rod 485 is moved toward the right in order to withdraw the rod 485 from the block 474, whereupon the slide 471 and rod 469 may be moved downwardly from the position shown in Fig. 41 to that shown in Fig. 37 thereby permitting the clutch members 303 and 304 to be reengaged by the spring 460. When this occurs the last half of the cycle of movements produced by the rotating gear 311 will be resumed in order to effect the retraction of the tone arm from the record and the return of the tone arm to normal position and the replacing of the record upon the magazine just as would have taken place if the record has been completely played.

It will be noticed that the application of the individual cancel button 701 is effective only after the control cams have completed the first half of their cycle, since the position of the block 474 for cooperating with the individual cancel is automatically resumed after the first half of the cycle of movement.

While the form of embodiment of the present invention as herein disclosed, constitutes a preferred form, it is to be understood that other forms might be adopted, all coming within the scope of the claims which follow.

What is claimed is as follows:

1. An automatic phonograph comprising, in combination, a carriage, a record magazine supported by the carriage, a rotatable turntable, a mechanism for transferring a record disc from the magazine to the turntable and vice versa, a mechanism for moving the carriage in at least one of two directions to locate the desired record disc adjacent to the disc transfer mechanism, means for conditioning the disc transfer mechanism for placing the disc upon the turntable with a certain side up depending upon the direction of movement of the carriage just before stopping, and a reproducer for playing the disc.

2. An automatic phonograph comprising, in combination, a carriage, a record magazine supported by the carriage, a rotatable turntable, a mechanism for transferring a record disc from the magazine to the turntable and vice versa, a carriage moving mechanism comprising a rotatable pinion member and a cooperating endless rack member of oblong form elongated in the directions of movement of the carriage, one of said members being movable with the carriage, means for conditioning the disc transfer mechanism for placing the disc upon the turntable with a certain side up depending upon the direction of movement of the carriage just before stopping, and a reproducer for playing the disc.

3. An automatic phonograph comprising, in combination, a carriage, a record magazine supported by the carriage, a rotatable turntable, a mechanism for transferring a record disc from the magazine to the turntable and vice versa, a carriage moving mechanism comprising a rotatable pinion member and a cooperating endless rack member of oblong form elongated in the directions of movement of the carriage, one of said members being movable with the carriage, means responsive to the pinion changing its course relative to the rack for conditioning the disc transfer mechanism for placing a disc upon the turntable with a certain side up, and a reproducer for playing the disc.

4. An automatic phonograph comprising, in combination, a carriage, a record magazine supported by the carriage, a rotatable turntable, a mechanism for transferring a record disc from the magazine to the turntable and vice versa, a carriage moving mechanism comprising a rotatable pinion member and a cooperating endless rack member of oblong form elongated in the directions of movement of the carriage, one of said members being movable with the carriage, means responsive to movement of the pinion relatively around the ends of the rack for conditioning the disc transfer mechanism for placing a disc upon the turntable with a certain side up, and a reproducer for playing the disc.

5. An automatic phonograph comprising, in combination, a carriage, a record magazine supported by the carriage, a rotatable turntable, a mechanism for transferring a record disc from the magazine to the turntable and vice versa and comprising record gripping fingers, a frame carrying the fingers, means for supporting the frame for rotation about an axis in the plane of the disc in order to place the disc either side up upon the turntable, means for bodily moving the frame so as to locate the disc upon the table, means for causing the gripper frame to rotate selectively in a predetermined direction and comprising pairs of mutilated bevel gears, one gear of each pair being carried by the gripper frame coaxially with respect to its axis, a frame carrying the other gears and movable in order to condition one of the pairs of bevel gears for cooperation when the gripper frame is bodily moved while the other pair of gears remain disconnected, a mechanism for moving the carriage in at least one of two directions to locate the desired record disc adjacent to the disc transfer mechanism, means for shifting the gear frame in response to the changing of the direction of movement of the carriage, and a reproducer for playing the disc.

6. An automatic phonograph comprising, in combination, a carriage, a record magazine supported by the carriage, a rotatable turntable, a mechanism for transferring a record disc from the magazine to the turntable and vice versa and comprising record gripping fingers, a frame carrying the fingers, means for supporting the frame for rotation about an axis in the plane of the disc in order to place the disc either side up upon the turntable, means for bodily moving the frame so as to locate the disc upon the table, means for causing the gripper frame to rotate selectively in a predetermined direction and comprising pairs of mutilated bevel gears, one gear of each pair being carried by the gripper frame coaxially with respect to its axis, a frame carrying the other gears and movable in order to condition one of the pairs of bevel gears for cooperation when the gripper frame is bodily moved while the other pair of gears remain disconnected, a carriage moving mechanism comprising a rotatable pinion member and a cooperating endless rack member of oblong form elongated in the directions of movement of the carriage, one of said members being movable with the carriage, means for shifting the gear frame in response to the changing of the direction of movement of the carriage, and a reproducer for playing the disc.

7. An automatic phonograph comprising, in combination, a carriage, a record magazine supported by the carriage, a rotatable turntable, a mechanism for transferring a record disc from the magazine to the turntable and vice versa and comprising record gripping fingers, a frame carrying the fingers, means for supporting the frame for rotation about an axis in the plane of the disc in order to place the disc either side up upon the turntable, means for bodily moving the frame so as to locate the disc upon the table, means for causing the gripper frame to rotate selectively in a predetermined direction and comprising pairs of mutilated bevel gears, one gear of each pair being carried by the gripper frame coaxially with respect to its axis, a frame carrying the other gears and movable in order to condition one of the pairs of bevel gears for cooperation when the gripper frame is bodily moved while the other pair of gears remain disconnected, a carriage moving mechanism comprising a rotatable pinion member and a cooperating endless rack member of oblong form elongated in the directions of movement of the carriage, one of said members being movable with the carriage, means responsive to the pinion changing its course relative to the rack for shifting the gear frame, and a reproducer for playing the disc.

8. An automatic phonograph comprising, in combination, a carriage, a record magazine supported by the carriage, a rotatable turntable, a mechanism for transferring a record disc from the magazine to the turntable and vice versa and comprising record gripping fingers, a frame carrying the fingers, means for supporting the frame for rotation about an axis in the plane of the disc in order to place the disc either side up upon the turntable, means for bodily moving the frame so as to locate the disc upon the table, means for causing the gripper frame to rotate selectively in a predetermined direction and comprising pairs of mutilated bevel gears, one gear of each pair being carried by the gripper frame coaxially with respect to its axis, a frame carrying the other gears and movable in order to condition one of the pairs of bevel gears for cooperation when the gripper frame is bodily moved while the other pair of gears remain disconnected, a carriage moving mechanism comprising a rotatable pinion member and a cooperating endless rack member of oblong form elongated in the directions of movement of the carriage, one of said members being movable with the carriage, means responsive to the movement of the pinion relatively around the ends of the rack for shifting the gear frame, and a reproducer for playing the disc.

9. An automatic phonograph comprising, in combination, a carriage, a record magazine supported by the carriage, a rotatable turntable, a mechanism for transferring a record disc from the magazine to the turntable and vice versa and comprising a pair of fingers for gripping a disc adjacent its periphery, a gripper frame carrying the gripper fingers and rotatable bodily about an axis parallel to the plane of the turntable in order to place the record upon the table and rotatable about an axis in the plane of the record in order to turn the disc either side adjacent to the table before placing the disc upon the table, means for causing the gripper frame to rotate about the second mentioned axis selectively in a predetermined direction and comprising pairs of mutilated bevel gears, one gear of each pair being carried by the gripper frame coaxially with respect to the second mentioned axis, a frame carrying the other gears and movable in order to condition one of the pairs of bevel gears for cooperation when the gripper frame is moved about the first mentioned axis while the other pair of gears remain disconnected, a mechanism for moving the carriage in at least one of two directions to locate the desired record disc adjacent to the disc transfer mechanism, means for shifting the gear frame in response to the changing of the direction of movement of the carriage, and a reproducer for playing the disc.

10. An automatic phonograph comprising, in combination, a carriage, a record magazine supported by the carriage, a rotatable turntable, a mechanism for transferring a record disc from the magazine to the turntable and vice versa and comprising a pair of fingers for griping a disc adjacent its periphery, a gripper frame carrying the gripper fingers and rotatable bodily about an axis parallel to the plane of the turntable in order to place the record upon the table and rotatable about an axis in the plane of the record in order to turn the disc either side adjacent to the table before placing the disc upon the table, means for causing the gripper frame to rotate about the second mentioned axis selectively in a predetermined direction and comprising pairs of mutilated bevel gears, one gear of each pair being carried by the gripper frame coaxially with respect to the second mentioned axis, a frame carrying the other gears and movable in order to condition one of the pairs of bevel gears for cooperation when the gripper frame is moved about the first mentioned axis while the other pair of gears remain disconnected, a carriage moving mechanism comprising a rotatable pinion member and a cooperating endless rack member of oblong form elongated in the directions of movement of the carriage, one of said members being movable with the carriage, means for shifting the gear frame in response to the changing of the direction of movement of the carriage, and a reproducer for playing the disc.

11. An automatic phonograph comprising, in combination, a carriage, a record magazine supported by the carriage, a rotatable turntable, a mechanism for transferring a record disc from the magazine to the turntable and vice versa and comprising a pair of fingers for gripping a disc adjacent its periphery, a gripper frame carrying the gripper fingers and rotatable bodily about an axis parallel to the plane of the turntable in order to place the record upon the table and rotatable about an axis in the plane of the record in order to turn the disc either side adjacent to the table before placing the disc upon the table, means for causing the gripper frame to rotate about the second mentioned axis selectively in a predetermined direction and comprising pairs of mutilated bevel gears, one gear of each pair being carried by the gripper frame coaxially with respect to the second mentioned axis, a frame carrying the other gears and movable in order to condition one of the pairs of bevel gears for cooperation when the gripper frame is moved about the first mentioned axis while the other pair of gears remain disconnected, a carriage moving mechanism comprising a rotatable pinion member and a cooperating endless rack member of oblong form elongated in the directions of movement of the carriage, one of said members being movable with the carriage, means responsive to the pinion changing its course relative to the rack for shifting the gear frame, and a reproducer for playing the disc.

12. An automatic phonograph comprising, in combination, a carriage, a record magazine supported by the carriage, a rotatable turntable, a mechanism for transferring a record disc from the magazine to the turntable and vice versa and comprising a pair of fingers for gripping a disc adjacent its periphery, a gripper frame carrying the gripper fingers and rotatable bodily about an axis parallel to the plane of the turntable in order to place the record upon the table and rotatable about an axis in the plane of the record in order to turn the disc either side adjacent to the table before placing the disc upon the table, means for causing the gripper frame to rotate about the second mentioned axis selectively in a predetermined direction and comprising pairs of mutilated bevel gears, one gear of each pair being carried by the gripper frame coaxially with respect to the second mentioned axis, a frame carrying the other gears and movable in order to condition one of the pairs of bevel gears for cooperation when the gripper frame is moved about the first mentioned axis while the other pair of gears remain disconnected, a carriage moving mechanism comprising a rotatable pinion member and a cooperating endless rack member of oblong form elongated in the directions of movement of the carriage, one of said members being movable with the carriage, means responsive to the movement of the pinion relatively around the ends of the rack for shifting the gear frame, and a reproducer for playing the disc.

13. An automatic phonograph comprising, in combination, a carriage, a record magazine supported by the carriage, a rotatable turntable, a mechanism for transferring a record disc from the magazine to the table and vice versa, a carriage moving mechanism comprising a rotatable pinion and a cooperating endless rack of oblong form elongated in the direction of movement of the carriage, said rack being attached to the carriage, means for guiding the pinion for movement only transverse to the movement of the rack, means for conditioning the disc transfer mechanism for placing a disc upon the table with a certain side up, said means being in response to a certain direction of transverse movement of the pinion, and a reproducer for playing the disc.

14. An automatic phonograph comprising, in combination, a carriage, a record magazine supported by the carriage, a rotatable turntable, a mechanism for transferring a record disc from the magazine to the table and vice versa, a carriage moving mechanism comprising a rotatable pinion and a cooperating endless rack of oblong form elongated in the direction of movement of the carriage, said rack being attached to the carriage, a rotatable, swinging shaft carrying the pinion at the free end thereof, means for guiding the shaft for swinging movement in a plane only at right angles to the direction of movement of the carriage, means for conditioning the disc transfer mechanism for placing a disc upon the table with a certain side up, said means being responsive to a certain direction of swinging movement of the pinion shaft, and a reproducer for playing the disc.

15. An automatic phonograph comprising, in combination, a carriage, a record magazine supported by the carriage, a rotatable turntable, a mechanism for transferring a record disc from the magazine to the turntable and vice versa and comprising record gripping fingers, a frame carrying the fingers, means for supporting the frame for rotation about an axis in the plane of the disc in order to place the disc either side up upon the turntable, means for bodily moving the frame so as to locate the disc upon the table, means for causing the gripper frame to rotate selectively in a predetermined direction and comprising pairs of mutilated bevel gears, one gear of each pair being carried by the gripper frame coaxially with respect to its axis, a frame carrying the other gears and movable in order to condition one of the pairs of bevel gears for cooperation when the gripper frame is bodily moved while the other pair of gears remain disconnected, a carriage moving mechanism comprising a rotatable pinion and a cooperating endless rack of oblong form elongated in the direction of movement of the carriage, said rack being attached to the carriage, means for guiding the pinion for movement only transverse to the movement of the rack, means for shifting the gear frame in response to transverse movement of the pinion, and a reproducer for playing the disc.

16. An automatic phonograph comprising, in combination, a carriage, a record magazine supported by the carriage, a rotatable turntable, a mechanism for transferring a record disc from the magazine to the turntable and vice versa and comprising record griping fingers, a frame carrying the fingers, means for supporting the frame for rotation about an axis in the plane of the disc in order to place the disc either side up upon the turntable, means for bodily moving the frame so as to locate the disc upon the table, means for causing the gripper frame to rotate selectively in a predetermined direction and comprising pairs of mutilated bevel gears, one gear of each pair being carried by the gripper frame coaxially with respect to its axis, a frame carrying the other gears and movable in order to condition one of the pairs of bevel gears for cooperation when the gripper frame is bodily moved while the other pair of gears remain disconnected, a carriage moving mechanism comprising a rotatable pinion and a cooperating endless rack of oblong form elongated in the direction of movement of the carriage, said rack being attached to the carriage, a rotatable, swinging shaft carrying the pinion at the free end thereof, means for guiding the shaft for swinging movement in a plane only at right angles to the direction of movement of the carriage, means for shifting the gear frame in response to transverse movement of the pinion, and a reproducer for playing the disc.

17. An automatic phonograph comprising, in combination, a carriage, a record magazine supported by the carriage, a rotatable turntable, a mechanism for transferring a record disc from the magazine to the turntable and vice versa and comprising a pair of fingers for gripping a disc adjacent its periphery, a gripper frame carrying the gripper fingers and rotatable bodily about an axis parallel to the plane of the turntable in order to place the record upon the table and rotatable about an axis in the plane of the record in order to turn the disc either side adjacent to the table before placing the disc upon the table, means for causing the gripper frame to rotate about the second mentioned axis selectively in a predetermined direction and comprising pairs of mutilated bevel gears, one gear of each pair being carried by the gripper frame coaxially with respect to the second mentioned axis, a frame carrying the other gears and movable in order to condition one of the pairs of bevel gears for cooperation when the gripper frame is moved about the first mentioned axis while the other pair of gears remain disconnected, a carriage moving mechanism comprising a rotatable pinion and a cooperating endless rack of oblong form elongated in the direction of movement of the carriage, said rack being attached to the carriage, means for guiding the pinion for movement only transverse to the movement of the rack, means for shifting the gear frame in response to transverse movement of the pinion, and a reproducer for playing the disc.

18. An automatic phonograph comprising, in combination, a carriage, a record magazine supported by the carriage, a rotatable turntable, a mechanism for transferring a record disc from the magazine to the turntable and vice versa and comprising a pair of fingers for gripping a disc adjacent its periphery, a gripper frame carrying the gripper fingers and rotatable bodily about an axis parallel to the plane of the turntable in order to place the record upon the table and rotatable about an axis in the plane of the record in order to turn the disc either side adjacent to the table before placing the disc upon the table, means for causing the gripper frame to rotate about the second mentioned axis selectively in a predetermined direction and comprising pairs of mutilated bevel gears, one gear of each pair being carried by the gripper frame coaxially with respect to the second mentioned axis, a frame carrying the other gears and movable in order to condition one of the pairs of bevel gears for cooperation when the gripper frame is moved about the first mentioned axis while the other pair of gears remain disconnected, a carriage moving mechanism comprising a rotatable pinion and a cooperating endless rack of oblong form elongated in the direction of movement of the carriage, said rack being attached to the carriage, a rotatable, swinging shaft carrying the pinion at the free end thereof, means for guiding the shaft for swinging movement in a plane only at right angles to the direction of movement of the carriage, means for shifting the gear frame in response to transverse movement of the pinion, and a reproducer for playing the disc.

19. An automatic phonograph comprising, in combination, a carriage, a record magazine supported by the carriage, a rotatable turntable, a mechanism for transferring a record disc from the magazine to the table and vice versa, a carriage moving mechanism comprising a rotatable pinion and a cooperating endless rack of oblong form elongated in the direction of movement of the carriage, said rack being attached to the carriage, means for guiding the pinion for movement relatively around the ends of the rack, means responsive to a certain direction of relative movement of the pinion around the ends of the rack for conditioning the disc transfer mechanism for placing a disc upon the table with a certain side up upon the table, and a reproducer for playing the disc.

20. An automatic phonograph comprising, in combination, a carriage, a record magazine supported by the carriage, a rotatable turntable, a mechanism for transferring a record disc from the magazine to the turntable and vice versa and comprising record gripping fingers, a frame carrying the fingers, means for supporting the frame for rotation about an axis in the plane of the disc in order to place the disc either side up upon the turntable, means for bodily moving the frame so as to locate the disc upon the table, means for causing the gripper frame to rotate selectively in a predetermined direction and comprising pairs of mutilated bevel gears, one gear of each pair being carried by the gripper frame coaxially with respect to its axis, a frame carrying the other gears and movable in order to condition one of the pairs of bevel gears for cooperation when the gripper frame is bodily moved while the other pair of gears remain disconnected, a carriage moving mechanism comprising a rotatable pinion and a cooperating endless rack of oblong form elongated in the direction of movement of the carriage, said rack being attached to the carriage, means for guiding the pinion for movement relatively around the ends of the rack, means responsive to a certain direction of relative movement of the pinion around the ends of the rack for shifting the gear frame in a certain direction, and a reproducer for playing the disc.

21. An automatic phonograph comprising, in combination, a carriage, a record magazine supported by the carriage, a rotatable turntable, a mechanism for transferring a record disc from the magazine to the turntable and vice versa and comprising a pair of fingers for gripping a disc adjacent its periphery, a gripper frame carrying the gripper fingers and rotatable bodily about an axis parallel to the plane of the turnable in order to place the record upon the table and rotatable about an axis in the plane of the record in order to turn the disc either side adjacent to the table before placing the disc upon the turntable, means for causing the gripper frame to rotate about the second mentioned axis selectively in a predetermined direction and comprising pairs of mutilated bevel gears, one gear of each pair being carried by the gripper frame coaxially with respect to the second mentioned axis, a frame carrying the other gears and movable in order to condition one of the pairs of bevel gears for cooperation when the gripper frame is moved about the first mentioned axis while the other pair of gears remain disconnected, a carriage moving mechanism comprising a rotatable pinion and a cooperating endless rack of oblong form elongated in the direction of movement of the carriage, said rack being attached to the carriage, means for guiding the pinion for movement relatively around the ends of the rack, means responsive to a certain direction of relative movement of the pinion around the ends of the rack for shifting the gear frame in a certain direction, and a reproducer for playing the disc.

22. An automatic phonograph comprising, in combination, a turntable and driving mechanism, a record disc magazine, a carriage for moving the discs transversely to their planes, a carriage reciprocating mechanism, a tone arm and reproducer carried thereby, a mechanism for transferring a disc from the magazine to the carriage and vice versa, means responsive to the changing of the direction of movement of the carriage for conditioning the disc transfer mechanism for placing the disc with a predetermined side up upon the table, a mechanism for operating the tone arm to place the reproducer needle upon the start end of the record groove and elevating the needle following the playing of a record and returning the reproducer to normal position to permit the return of the disc to the magazine, and a control apparatus for said mechanisms including a manually operable record selecting device for effecting, in succession, the stopping of the carriage in a certain position following the movement of the carriage in a predetermined direction toward that certain position, the transfer of a disc from the magazine to the table with a certain side up upon the table, the placing of the reproducer upon the record, the elevation of the reproducer and return to normal position following the playing of the record, the return of the record to the magazine, and finally the stopping of the machine.

23. An automatic phonograph comprising, in combination, a turntable and driving mechanism, a record disc magazine, a carriage for moving the discs transversely to their planes, a carriage reciprocating mechanism comprising an endless rack member and a cooperating pinion member, one of said members being movable with the carriage, said rack member being elongated in the direction of movement of the carriage, means for rotating the pinion, means for guiding the pinion for bodily movement transverse to the direction of movement of the carriage, a tone arm and reproducer carried thereby, a mechanism for transferring a disc from the magazine to the carriage and vice versa, means responsive to the transverse bodily movement of the pinion for conditioning the disc transfer mechanism for placing the disc with a predetermined side up upon the table, a mechanism for operating the tone arm to place the reproducer needle upon the start end of the record groove and elevating the needle following the playing of a record and returning the reproducer to normal position to permit the return of the disc to the magazine, and a control apparatus for said mechanisms including a manually operable record selecting device for effecting, in succession, the stopping of the carriage in a certain position following the movement of the carriage in a predetermined direction toward that certain position, the transfer of a disc from the magazine to the table with a certain side up upon the table, the placing of the reproducer upon the record, the elevation of the reproducer and return to normal position following the playing of the record, the return of the record to the magazine, and finally the stopping of the machine.

24. An automatic phonograph comprising, in combination, a turntable and driving mechanism, a record disc magazine, a carriage for moving the discs transversely to their planes, a carriage reciprocating mechanism comprising an endless rack member attached to the carriage and elongated in the direction of movement thereof and a cooperating pinion member, means for rotating the pinion, means for guiding the pinion for bodily movement transverse to the direction of movement of the carriage, a tone arm and reproducer carried thereby, a mechanism for transferring a disc from the magazine to the carriage and vice versa, means responsive to the transverse bodily movement of the pinion for conditioning the disc transfer mechanism for placing the disc with a predetermined side up upon the table, a mechanism for operating the tone arm to place the reproducer needle upon the start end of the record groove and elevating the needle following the playing of a record and returning the reproducer to normal position to permit the return of the disc to the magazine, and a control apparatus for said mechanisms including a manually operable record selecting device for effecting, in succession, the stopping of the carriage in a certain position following the movement of the carriage in a predetermined direction toward that certain position, the transfer to a disc from the magazine to the table with a certain side up upon the table, the placing of the reproducer upon the record, the elevation of the reproducer and return to normal position following the playing of the record, the return of the record to the magazine, and finally the stopping of the machine.

25. An automatic phonograph, comprising in combination, a turntable and driving mechanism, a magazine for holding record discs in parallel planes, a magazine carriage movable transversely to the planes of the discs, a mechanism for reciprocating the carriage, a tone arm and a reproducer carried thereby, a mechanism for transferring a disc from the magazine to the table and vice versa, a mechanism for operating the tone arm to place the reproducer needle upon the start end of the record groove and for elevating the needle at the end of the playing of a record and then returning the reproducer to a position permitting return of the record disc to the magazine, a motor for driving the turntable, a normally connected clutch connecting the motor and carriage reciprocating mechanism, a normally disconnected clutch for connecting the motor with the record disc transfer mechanism and with the tone arm operating mechanism, and a control device including manually operable record selecting means for effecting, in succession, the operation of the motor to drive the turntable and the carriage operating mechanism, the disconnection of the carriage operating mechanism from the motor after movement of the magazine to a certain position depending upon the record disc selected, the connection of the second mentioned clutch to effect the transfer of a record disc to the table with a predetermined side up depending upon the direction of movement of the magazine carriage and the placing of the reproducer needle upon the start end of record groove, the disconnection of said second clutch during playing of the record, the reconnection of said second clutch following playing of the record in order to return the disc to the magazine and return the reproducer to normal position, and finally the redisconnection of said clutch, the reconnection of the first clutch and the stopping of the motor.

In testimony whereof we hereto affix our signatures.

HERBERT L. BRUMP.
FREDERICK O. GRAY.
FLOYD E. GRAY.